(12) United States Patent
Handelman

(10) Patent No.: US 7,099,587 B2
(45) Date of Patent: Aug. 29, 2006

(54) APPARATUS AND METHOD FOR DELAYING OPTICAL SIGNALS FOR OPTICAL BUFFERING AND OPTICAL STORAGE APPLICATIONS

(76) Inventor: Doron Handelman, 14 Hamaavak Street, Givatayim (IL) 53520

( * ) Notice: Subject to any disclaimer, the term of this patent is extended or adjusted under 35 U.S.C. 154(b) by 759 days.

(21) Appl. No.: 10/152,289

(22) Filed: May 22, 2002

(65) Prior Publication Data

US 2004/0208418 A1    Oct. 21, 2004

(51) Int. Cl.
 *H04J 14/08* (2006.01)
(52) U.S. Cl. .................. 398/102; 398/79; 398/45; 398/52; 398/53; 398/158; 398/161; 398/176; 385/1; 385/2; 385/4; 385/5; 385/14; 385/15; 250/227.12
(58) Field of Classification Search ............. 359/130, 359/12; 398/158, 102, 79, 45, 52, 53, 161, 398/176; 385/14, 15, 1.2, 4.5; 342/375; 250/227.12
See application file for complete search history.

(56) References Cited

U.S. PATENT DOCUMENTS

| | | | |
|---|---|---|---|
| 4,626,075 A | 12/1986 | Chemla | |
| 4,726,010 A | 2/1988 | Ali et al. | |
| 5,191,457 A | 3/1993 | Yamazaki | |
| 5,319,484 A | 6/1994 | Jacob et al. | |
| 5,325,222 A | 6/1994 | Jacob et al. | |
| 5,414,548 A * | 5/1995 | Tachikawa et al. ........... | 398/87 |
| 5,416,625 A | 5/1995 | Cavaciuti et al. | |
| 5,430,454 A * | 7/1995 | Refregier et al. ........... | 342/375 |
| 5,542,010 A * | 7/1996 | Glance et al. ............... | 385/14 |
| 5,774,244 A | 6/1998 | Tandon et al. | |
| 5,953,138 A | 9/1999 | Ellis | |
| 6,023,360 A | 2/2000 | Morioka et al. | |
| 6,204,944 B1 | 3/2001 | Uchiyama et al. | |
| 6,233,082 B1 | 5/2001 | Johnson | |
| 6,288,808 B1 | 9/2001 | Lee et al. | |
| 6,314,115 B1 | 11/2001 | Delfyett et al. | |
| 6,631,246 B1 * | 10/2003 | Ford et al. .................. | 398/158 |
| 2003/0076865 A1 | 4/2003 | Chang-Hasnain et al. | |
| 2003/0099018 A1 * | 5/2003 | Singh et al. ................ | 359/152 |

OTHER PUBLICATIONS

Mining the Optical Bandwidth for a Terabit per second, Alan Wilner, IEEE Spectrum, Apr. 1997, pp. 32-41.
Multiple Wavelengths Exploit Fiber Capacity, Eric Lerner, Laser Focus World, Jul. 1997, pp. 119-125.
Advances in Dense WDM push diode-laser design, Diana Zankowsky, Laser Focus World, Aug. 1997, pp. 167-171.
Multistage Amplifier Provides Gain across 80 nm, pp. 22-23.
Optical Switching Promises cure for telecommunications logjam, Jeff Hecht, Laser Focus World, Sep. 1998, pp. 69-72.

(Continued)

*Primary Examiner*—Hanh Phan

(57) ABSTRACT

A delayed optical signal is generated from an inputted optical signal by cyclically transmitting the inputted optical signal between at least two ends of an optical medium and outputting the inputted optical signal from one of the ends of the optical medium after at least one transmission cycle via the optical medium. Each transmission of the inputted optical signal in a direction via the optical medium is carried out over a wavelength resource that is different from a wavelength resource used in a preceding transmission of the inputted optical signal in a direction via the optical medium. Interference among repeated transmissions of the inputted optical signal via the optical medium is therefore minimized or even avoided. Related apparatus and method are also described.

33 Claims, 5 Drawing Sheets

OTHER PUBLICATIONS

The Communications Handbook, Jeffrey Gibson, 1997, pp. 883-890.
Speed Demons: Is 'Faster' Better and Cheaper? Stephanie Weiss, Photonics Spectra, Feb. 1999, pp. 96-102.
Wavelength Lockers Keep Lasers in Line, Ed Miskovic, Photonics Spectrra, Feb. 1999, pp. 104-110.
Optical Networks, Hector Escobar, Photonics Spectra, Dec. 1998, pp. 163-167.
Multigigabit Networks: The Challenge, Claude Rolland et al., IEEE Ltd, May 1992, pp. 16-26.
Dirct Detection Lightwave Systems: Why Pay More? Paul Green et al., IEEE LCS, Nov. 1990, pp. 36-49.
Photonics in Switching, Scott Hinton, IEEE Ltd, Aug. 1992, pp. 26-35.
Fiber Amplifiers Expand Network Capacities, Eric Lerner, Laser Focus World, Aug. 1997, pp. 85-96.
Technologies for Local-Access Fibering, Yukou Mochida, IEEE Communications Magazine, Feb. 1994, pp. 64-72.
Wavelength-Division Switching Technology in Photonic Switching Systems, Suzuki et al., IEEE International Conference on Communications, ICC 1990, pp. 1125-1129.
Design and Cost Performance of the Multistage WDN-PON Access Network, Guido Maier et al., Journal of Lightwave Technology, vol. 18, No. 2, Feb. 2000, pp. 125-143.
Photons at Work: Optical Networks on the Rise, Lee Goldberg, Electronic Design, Mar. 22, 1999, pp. 56-66.
Combining Gratings and Filters Redues WDM Channel Spacing, Pan and Shi, OptoElectronics World, Sep. 1998, pp. S11-S17.
Picosecond-Accuracy All-Optical Bit Phase Sensing Using a Nonlinear Optical Loop Mirror, Hall et al., IEEE Photonics Technology Letters, vol. 7, No. 8, Aug. 1995, pp. 935-937.
An Ultrafast Variable Optical Delay Technique, Hall et al., IEEE Photonics Technology Letters, vol. 12, No. 2, Feb. 2000, pp. 208-210.
Variable Optical delay line with diffraction limited Autoalignment, Klovekorn and Munch, Applied Optics, Apr. 1, 1998, vol. 37, No. 10, pp. 1903-1904.
Optical Amplifiers Revolutionize Communications, Laser Focus World, Sep. 1998, pp. 28-32.
Analysis and Dimensioning of Switchless Networks for Single-Layer Optical Architecture, Binetti et al., Journal of Lightwave Technology, vol. 18,. No. 2, Feb. 2000, pp. 144-153.
100-Gbit/s Bitwise Logic, Hall et al., MIT Lincoln Laboratory, Optics Letters, vol. 23, No. 16, Aug. 15, 1998, pp. 1271-1273.
The Communications Handbook, 1997, Chapter 39, pp. 542-553.
Architectural and Technological Issues for Future Optical Internet Networks, Listanti, et al., IEEE Communications Magazine, Sep. 2000, pp. 82-92.
IP Over Optical Networks: Architectural Aspects, Rajagopalan, et al., IEEE Communications Magazine, Sep. 2000, pp. 94-102.
Labeled Optical Burst Switching for IP-over-WDM Integration, Chunming Qiao, IEEE Communications Magazine, Sep. 2000, pp. 104-114.
Approaches to Optical Internet Packet Switching, Hunter, et al., IEEE Communications Magazine, Sep. 2000, pp. 116-122.
Photonic Switches: Fast, but Functional? McCarthy, Photonics Spectra, Mar. 2001, pp. 140-150.
Fiber-based components meets the needs of next-generation amplifiers, Bourgeois, WDM Solutions, Mar. 2001, pp. 67-74 www.optoelectronics-world.com.
Keep Your Photons in Line, Wesson et al., Photonics Spectra, Sep. 1999, pp. 102-108.
Nonlinear Optics, Kang, et al., Laser Focus World, Feb. 2002, pp. 3-5.
Polarization Mode Dispersion, Jones-Bey, Laser Focus World, May 2000, pp. 65-67.
100-km Negative-Dispersion Fiber Carries 10 Gb/s, Gaughan, Photonics Spectra, Nov. 2001, p. 42.
Managing Polarization Mode Dispersion, Chbat, Photonics Spectra, Jun. 2000, pp. 100-104.
Presstime Bulletin, Photonics Spectra, Dec. 2001, p. 18.
Dynamic Dispersion Compensation: When and Where Will It Be Needed? Huff et al., Phontonics Spectra, Dec. 2001, pp. 122-125.
Dispersion Management is Vital for High-Speed Systems, Hecht, Laser Focus World, Jul. 2001, pp. 79-83.
Tunable Compensators Master Chromatic-Dispersion Impairments, Willner, WDM Solutions, Jul. 2001, pp. 51-58.
Dispersion Compensation Gratings for the C-Band, Brennan, Photonics Spectra, Jun. 2001, pp. 159-165.
Hot Rubidium Slows Light Speed to 90 m/s, Kash, Laser Focus World, Aug. 1999, p.11.
Network Demonstrates 1500-km Unregenerated Transmission at 40 Gbit/s, Hamre, Laser Focus World, Jul. 2001, p. 11.
Electroholographic Switches are Fast and Compact, Agranat, Laser Focus World, Agranat, May 2001, pp. 109-111.
Switch Based on SOA Archieves Femtosecond Switching, Nakamura, Laser Focus World, Sep. 2001, p. 9.
Next-Generation Networks May Benefit from SOAs, Young, Laser Focus World, Sep. 2001, pp. 73-79.
All-Optical Converters Promise Improved Networks, Hecht, Laser Focus World, Apr. 2001, pp. 159-164.
Novel VOAs Provide More Speed and Utility, Cohen, Laser Focus World, Nov. 2000, pp. 139-146.
Array-Based VOAs Offer Compact Signal Control, Cockroft, WDM Solutions, Jun. 2001, pp. 81-85.
Variable optical delay circuit using wavelength converters, T. Sakamoto et al, Electronics Letters, vol. 37, No. 7, Mar. 29, 2001, pp. 454-455.

* cited by examiner

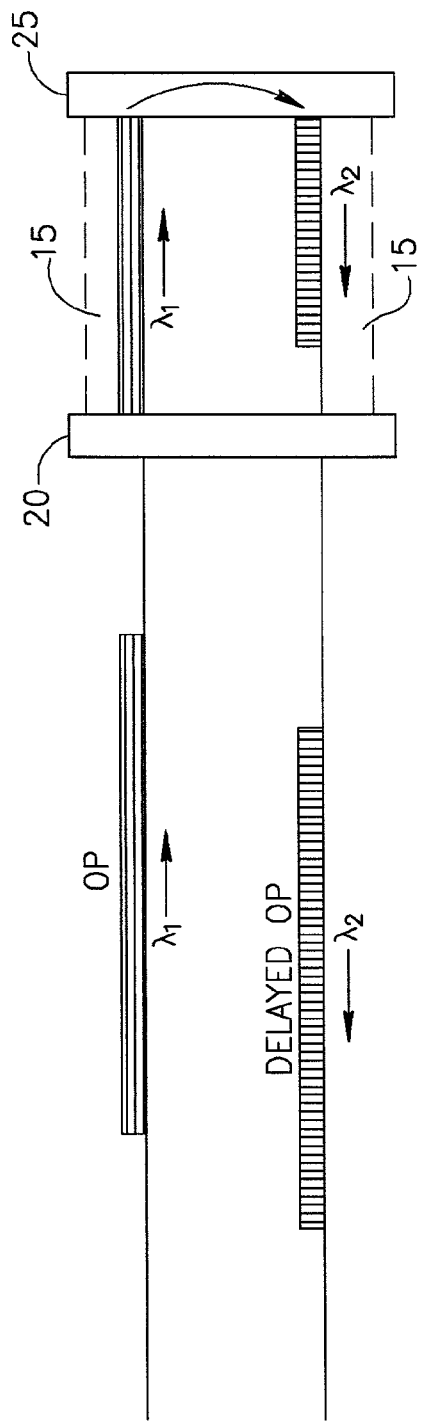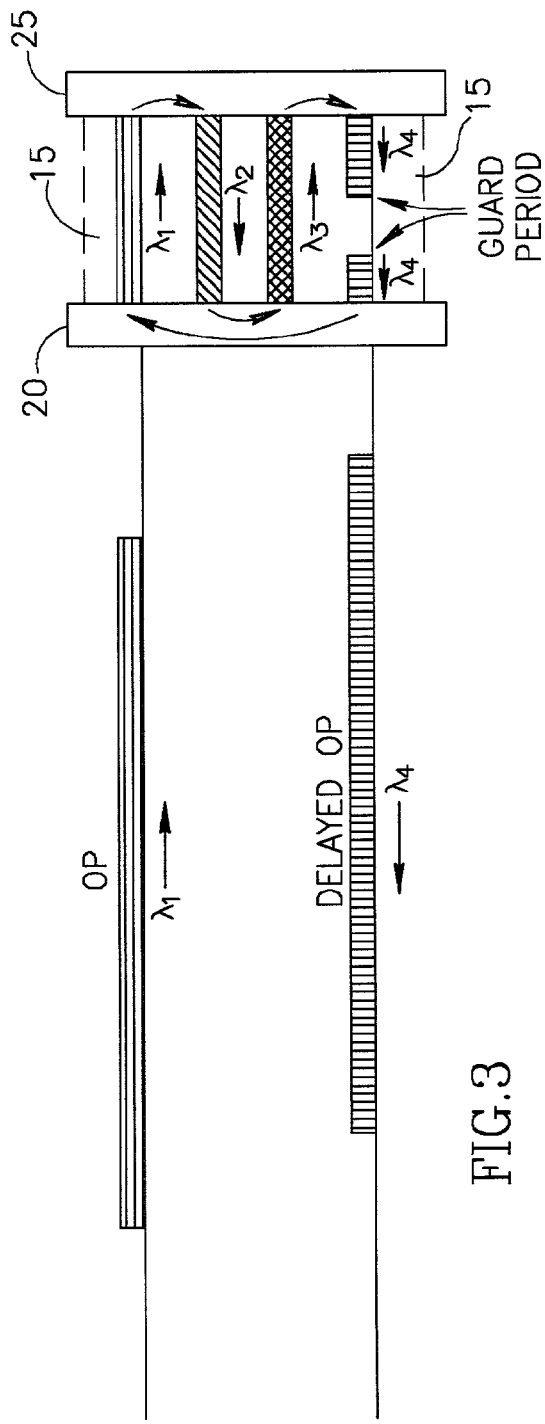
FIG.2
FIG.3

APPARATUS AND METHOD FOR DELAYING OPTICAL SIGNALS FOR OPTICAL BUFFERING AND OPTICAL STORAGE APPLICATIONS

FIELD OF THE INVENTION

The present invention generally relates to delaying of optical signals and more particularly to delaying of optical signals for optical buffering and optical storage applications.

BACKGROUND OF THE INVENTION

Today, fiber delay lines (FDLs) are used to provide optical buffering in many applications, such as optical switching applications. For example, in optical packet switching delaying of optical packets is typically required, as part of traffic engineering, in order to resolve bandwidth contention.

However, existing FDLs typically provide only limited delays for optical signals. Therefore, techniques and apparatus that can be used to provide extended delays for optical signals are considered as highly desired.

Some aspects of technologies and related art that may be useful in understanding the present invention are described in the following publications:

an article entitled "Architectural and Technological Issues for Future Optical Internet Networks", by Listanti et al in *IEEE Communications Magazine*, September 2000, pages 82–92;

an article entitled "IP Over Optical Networks: Architectural Aspects", by Rajagopalan et al in *IEEE Communications Magazine*, September 2000, pages 94–102;

an article entitled "Labeled Optical Burst Switching for IP-over-WDM Integration", by Chunming Qiao in *IEEE Communications Magazine*, September 2000, pages 104–114;

an article entitled "Approaches to Optical Internet Packet Switching", by Hunter et al in *IEEE Communications Magazine*, September 2000, pages 116–122;

an article entitled "A framework for unified traffic engineering in IP over WDM networks", by Song et al in *Optical Networks Magazine*, November/December 2001, pages 28–33;

an article entitled "Optimization of wavelength allocation in WDM optical buffers", by Callegati et al in *Optical Networks Magazine*, November/December 2001, pages 66–72;

an article entitled "Mining the Optical Bandwidth for a Terabit per Second", by Alan Eli Willner in *IEEE Spectrum*, April 1997, pages 32–41;

an article entitled "Variable optical delay line with diffraction-limited autoalignment" by Klovekorn et al in *Applied Optics*, Vol. 37, No. 10, Apr. 1, 1998, pages 1903–1904;

an article entitled "Picosecond-Accuracy All-Optical Bit Phase Sensing Using a Nonlinear Optical Loop Mirror", by Hall et al in *IEEE Photonics Technology Letters*, Vol. 7, No. 8, August 1995, pages 935–937;

an article entitled "An Ultrafast Variable Optical Delay Technique", by Hall et al in *IEEE Photonics Technology Letters*, Vol. 12, No. 2, February 2000, pages 208–210;

an article entitled "Design and Cost Performance of the Multistage WDM-PON Access Networks", by Maier et al in *Journal of Lightwave Technology*, Vol. 18, No. 2, February 2000, pages 125–143;

an article entitled "Multistage Amplifier Provides Gain Across 80 nm", by Kristin Lewotesky in *Laser Focus World*, September 1997, pages 22–24;

a conference review entitled "Optical amplifiers revolutionize communications", by Gary T. Forrest in *Laser Focus World*, September 1998, pages 28–32;

an article entitled "Optical Networks Seek Reconfigurable Add/Drop Options", by Hector E. Escobar in *Photonics Spectra*, December 1998, pages 163–167;

an article entitled "Multiple Wavelengths Exploit Fiber Capacity", by Eric J. Lerner in *Laser Focus World*, July 1997, pages 119–125;

an article entitled "Advances in Dense WDM Push Diode-Laser Design", by Diana Zankowsky in *Laser Focus World*, August 1997, pages 167–172;

an article entitled "Optical switching promises cure for telecommunications logjam", by Jeff Hecht in *Laser Focus World*, September 1998, pages 69–72;

an article entitled "Speed Demons: Is 'Faster' Better and Cheaper?", by Stephanie A. Weiss in *Photonics Spectra*, February 1999, pages 96–102;

an article entitled "Wavelength Lockers Keep Lasers in Line", by Ed Miskovic in *Photonics Spectra*, February 1999, pages 104–110;

an article entitled "Multigigabit Networks: The Challenge", by Rolland et al in *IEEE LTS*, May 1992, pages 16–26;

an article entitled "Direct Detection Lightwave Systems: Why Pay More?", by Green et al in *IEEE LCS*, November 1990, pages 36–49;

an article entitled "Photonics in Switching", by H. Scott Hinton in *IEEE LTS*, August 1992, pages 26–35;

an article entitled "Fiber amplifiers expand network capacities", by Eric J. Lerner in *Laser Focus World*, August 1997, pages 85–96;

an article entitled "Technologies for Local-Access Fibering", by Yukou Mochida in *IEEE Communications Magazine*, February 1994, pages 64–73;

an article entitled "Wavelength-Division Switching Technology in Photonic Switching Systems", by Suzuki et al in IEEE International Conference on Communications ICC '90, pages 1125–1129;

an article entitled "Photonic Switches: Fast, but Functional?", by Daniel C. McCarthy in *Photonics Spectra*, March 2001, pages 140–150;

an article entitled "Combining gratings and filters reduces WDM channel spacing", by Pan et al in *Optoelectronics World*, September 1998, pages S11–S17;

an article entitled "100-Gbit/s bitwise logic", by Hall et al in *Optics Letters*, Vol. 23, No. 16, Aug. 15, 1998, pages 1271–1273;

an article entitled "Analysis and Dimensioning of Switchless Networks for Single-Layer Optical Architecture", by Binetti et al in *Journal of Lightwave Technology*, Vol. 18, No. 2, February 2000, pages 144–153;

an article entitled "Fiber-based components meet the needs of next-generation amplifiers", by Stephane Bourgeois in *WDM Solutions*, March 2001, pages 67–74;

an article entitled "Keep Your Photons in Line", by Wesson et al in *Photonics Spectra*, September 1999, pages 102–108;

an article entitled "Photons At Work: Optical Networks On The Rise", by Lee Goldberg in *Electronic Design*, Mar. 22, 1999, pages 56–66;

an article entitled "Photonic packet switching and optical label swapping", by Daniel J. Blumenthal in *Optical Networks Magazine*, November/December 2001, pages 54–65;

an article entitled "On a dynamic wavelength assignment algorithm for wavelength routed all-optical networks", by Stoica et al in *Optical Networks Magazine*, January/February 2002, pages 68–80;

an article entitled "Crystal slows and stops light", by John Wallace in *Laser Focus World*, February 2002, Vol. 38, No. 2, pages 36–37;

an article entitled "Decision feedback loop compensates at 10 Gbit/s", by Hassaun Jones-Bey in *Laser Focus World*, May 2000, pages 65–67;

an article entitled "100-km Negative-Dispersion Fiber carries 10 Gb/s", by Richard Gaughan in *Photonics Spectra*, November 2001, page 42;

an article entitled "Managing Polarization Mode Dispersion", by Michel W. Chbat in *Photonics Spectra*, June 2000, pages 100–104;

an item entitled "Alcatel Displays 1.6-Tb/s Transmission" in the Presstime Bulletin section in *Photonics Spectra*, December 2001, page 18;

an article entitled "Dynamic Dispersion Compensation: When and Where Will It Be Needed?", by Lisa Huff and Christine Mulrooney in *Photonics Spectra*, December 2001, pages 122–125;

an article entitled "Dispersion management is vital for high-speed systems", by Jeff Hecht in *Laser Focus World*, July 2001, pages 79–87;

an article entitled "Tunable compensators master chromatic-dispersion impairments", by Alan Willner in *WDM Solutions*, July 2001, pages 51–58;

an article entitled "Dispersion Compensation Gratings for the C-Band", by James F. Brennan III in *Photonics Spectra*, June 2001, pages 159–165;

a newsbreak item entitled "Hot rubidium slows light speed to 90 m/s", in *Laser Focus World*, August 1999, page 11;

a newsbreak item entitled "Network demonstrates 1500-km unregenerated transmission at 40 Gbits/s", in *Laser Focus World*, July 2001, page 11;

an article entitled "Electroholographic switches are fast and compact", by Aharon J. Agranat in *Laser Focus World*, May 2001, pages 109–112;

a newsbreak item entitled "Switch based on SOA achieves femtosecond switching", in *Laser Focus World*, September 2001, page 9;

an article entitled "Next-generation networks may benefit from SOAs", by Martin Young in *Laser Focus World*, September 2001, pages 73–79;

an article entitled "All-optical converters promise improved networks", by Jeff Hecht in *Laser Focus World*, April 2001, pages 159–164;

an article entitled "Novel VOAs provide more speed and utility", by Stephen Cohen in *Laser Focus World*, November 2000, pages 139–146;

an article entitled "Array-based VOAs offer compact signal control", by Nigel Cockroft in *WDM Solutions*, June 2001, pages 81–86; and The following chapters in *The Communications Handbook*, CRC Press & IEEE Press, 1997, Editor-in-Chief Jerry D. Gibson: Chapter 39 on pages 542–553; and Chapter 65 on pages 883–890.

Additional aspects of technologies that may be useful in understanding the present invention are described in the following patents and patent applications:

U.S. Pat. No. 4,626,075 to Chemla that describes a nonlinear optical device that includes a layered semiconductor structure having layers of different energy band gap materials;

U.S. Pat. No. 5,191,457 to Yamazaki that describes a WDM optical communication network in which optical beams are modulated by channel discrimination signals of different frequencies;

U.S. Pat. No. 5,774,244 to Tandon et al. that describes an optical communications network that includes a plurality of passive optical networks (PONs) connected in a ring in PON address order, in which communication channels between terminals are wavelength multiplexed;

U.S. Pat. No. 6,233,082 to Johnson that describes an optical transmitter for generating any one of N carrier signals for use in an M-channel WDM system;

U.S. patent application Ser. No. 09/126,378 of Handelman, now U.S. Pat. No. 6,404,522, that describes improvements in communication performance of an optical communication system that communicates data via N different channel wavelengths using WDM;

U.S. patent application Ser. No. 09/389,345 of Handelman, now U.S. Pat. No. 6,574,018, that describes a network control system that may be embodied in various elements of a communication network that communicates optical signals multiplexed by WDM, where the network control system may limit a number of channel wavelengths actually used for communicating optical signals to an end node, and control and modify data rates carried over channel wavelengths multiplexed by WDM;

U.S. patent application Ser. No. 09/624,983 of Handelman, now U.S. Pat. No. 6,763,191, that describes an optical switching apparatus that selectively combines and separates series of optical signal samples using OTDM and/or WDM;

Published U.S. patent application Pub. No. U.S. 2002/0048067 A1 of Handelman et al that describes an optical switching apparatus that selectively combines and separates, using OTDM and/or WDM, optical signal samples that are obtained by a spread spectrum technique or a combination of optical signal samples that are obtained by a spread spectrum technique and optical signal samples that are carried over discrete channel wavelengths;

U.S. patent application Ser. No. 09/944,603 of Handelman, now published as Pub. No. US 2003/0048506, that describes an optical packet switch that switches optical packets according to bit-rates at which the optical packets are provided; and U.S. patent application Ser. No. 10/057,991 of Handelman, now published as Pub. No. U.S. 2003/0043430, that describes an optical packet switch in which NW wavelengths, over which inputted optical packets may be switched, are grouped into KG groups of wavelengths, where the KG groups of wavelengths are characterized in that each of the KG groups of wavelengths is allocated to optical packets distinguished from other optical packets by at least one attribute of at least one packet characteristic, and each one inputted optical packet is switched over a wavelength having an available transmission resource selected from among wavelengths in one of the KG groups of wavelengths that is matched to the one inputted optical packet by correspondence of attributes of the at least one packet characteristic.

The disclosures of all references mentioned above and throughout the present specification are hereby incorporated herein by reference.

SUMMARY OF THE INVENTION

The present invention seeks to provide improved method and apparatus for delaying optical signals and for enabling use of delayed optical signals in optical buffering applications and optical storage applications. The present invention may particularly be useful for optical buffering applications and optical storage applications in optical communication networks.

The present invention enables generation of a delayed optical signal from an inputted optical signal. The inputted optical signal is cyclically transmitted between at least two ends of an optical medium and outputted from one of the ends of the optical medium after at least one transmission cycle via the optical medium thereby generating the delayed optical signal. Each transmission of the inputted optical signal in a direction via the optical medium is carried out over a wavelength resource that is different from a wavelength resource used in a preceding transmission of the inputted optical signal in a direction via the optical medium. Interference among repeated transmissions of the inputted optical signal via the optical medium is therefore minimized or even avoided.

Each transmission cycle delays the inputted optical signal by a delay period which is a result of a division of twice the length of the optical medium by the speed of light in the optical medium. As the number of transmission cycles increases, an increased delay of the inputted optical signal may be obtained. Dispersion compensation and amplification of the inputted optical signal while traversing the optical medium may be employed to enable multiple transmission cycles without signal distortion and degradation.

Further objects and features of the present invention will become apparent to those skilled in the art from the following description and the accompanying drawings.

There is thus provided in accordance with a preferred embodiment of the present invention a method for optically delaying an optical signal, the method including cyclically transmitting the optical signal between at least two ends of an optical medium so that each transmission of the optical signal in a direction via the optical medium is carried out over a wavelength resource which is different from a wavelength resource used in a preceding transmission of the optical signal in a direction via the optical medium, and outputting the optical signal from one of the ends of the optical medium after at least one transmission cycle of the optical signal via the optical medium.

Preferably, the optical medium includes at least one of the following: at least one fiber optic cable, at least one atmospheric path, at least one optical waveguide, and a medium capable of slowing light. In a case where the optical medium includes a medium capable of slowing light, the method also preferably includes applying conditions that enable the medium to slow light.

Each wavelength resource may preferably include at least one of the following: a wavelength, a lightpath, and a polarization direction over a wavelength.

Additionally, the method may also preferably include scrambling the optical signal prior to the transmitting. Further additionally, the method may also preferably include compensating for dispersion of the optical signal while traversing the optical medium. The compensating may preferably include compensating for at least one of the following while the optical signal traverses the optical medium: chromatic mode dispersion, and polarization mode dispersion. Alternatively, the compensating may preferably include employing tunable dispersion compensation for compensating for at least one of the following while the optical signal traverses the optical medium: chromatic mode dispersion, and polarization mode dispersion.

Additionally, the method may also include amplifying the optical signal while traversing the optical medium. Further additionally, the method may also include converting an output wavelength resource over which the optical signal is outputted from the one of the ends of the optical medium into a selected wavelength resource.

The cyclically transmitting may preferably include obtaining a single replica of the optical signal that is carried over an input wavelength resource, converting the input wavelength resource into an output wavelength resource, and transmitting the single replica of the optical signal over the output wavelength resource. The obtaining may preferably include filtering at least one received replica of the optical signal.

There is also provided in accordance with a preferred embodiment of the present invention apparatus for optically delaying an optical signal, the apparatus including optical retransmission units at at least two ends of an optical medium and an output unit, the optical retransmission units being operative to cyclically transmit the optical signal between the at least two ends of the optical medium so that each transmission of the optical signal in a direction via the optical medium is carried out over a wavelength resource which is different from a wavelength resource used in a preceding transmission of the optical signal in a direction via the optical medium, and the output unit is operatively associated with at least one of the optical retransmission units and is operative to output the optical signal from one of the ends of the optical medium after at least one transmission cycle of the optical signal via the optical medium.

Preferably, each of the optical retransmission units includes at least one wavelength resource converter (WRC) operative to convert an input wavelength resource, over which an obtained replica of the optical signal is carried, into an output wavelength resource over which the obtained replica of the optical signal is transmitted. The at least one WRC may preferably include a tunable wavelength resource converter (TWRC).

Each of the optical retransmission units may additionally include at least one optical filter that is operative to obtain a single replica of the optical signal. The at least one optical filter may preferably include a tunable optical filter (TOF). Each of the optical retransmission units may further additionally include a transmission multiplexer operative to provide the optical signal to the optical medium in a multiplexed form.

Additionally, the apparatus may also include a controller operative to control a switching element associated with one of the optical retransmission units for providing a delayed replica of the optical signal to the output unit.

Preferably, the output unit may include an output multiplexer operatively associated with a plurality of switching elements that are operatively associated with at least one of the optical retransmission units, the output multiplexer being operative to output the optical signal provided via one of the plurality of switching elements after at least one transmission cycle of the optical signal via the optical medium. Additionally, the output unit may also include a tunable wavelength resource converter operatively associated with the output multiplexer and operative to convert an output wavelength resource over which the optical signal is outputted from the output multiplexer into a selected wavelength resource.

The optical medium may include at least one fiber optic cable that may preferably include a dispersion-shifted fiber optic cable. Alternatively or additionally, the optical medium may include at least one of the following: at least one atmospheric path, at least one optical waveguide, and a medium capable of slowing light. In a case where the optical medium includes a medium capable of slowing light, the apparatus also preferably includes means for applying conditions that enable the medium to slow light.

The wavelength resource may preferably include at least one of the following: a wavelength, a lightpath, and a polarization direction over a wavelength.

The apparatus may additionally include dispersion compensation means operative to compensate for dispersion of the optical signal while traversing the optical medium. Further additionally, the apparatus may also include an optical amplifier operative to amplify the optical signal while traversing the optical medium. The optical amplifier may preferably include a Raman amplifier.

The apparatus for optically delaying an optical signal may be included in an optical communication network, wherein each of the optical retransmission units is preferably included in a network element (NE) in the optical communication network. In such a case, the optical medium may include at least one normally redundant fiber optic cable in the optical communication network, the at least one normally redundant fiber optic cable associating two of the optical retransmission units.

Alternatively, the optical medium may include at least one normally active fiber optic cable in the optical communication network that associates two NEs in the network. In such a case, each wavelength resource used in the apparatus for optically delaying an optical signal preferably includes a wavelength resource that is not normally used in communication between the two NEs over the at least one normally active fiber optic cable.

The apparatus for optically delaying an optical signal may also be used as an optical memory cell in an optical memory that includes at least one optical memory cell and a memory controller operatively associated with the at least one memory cell and operative to control storage in and retrieval from the at least one memory cell.

Further in accordance with a preferred embodiment of the present invention there is provided a delayed optical signal generated from an inputted optical signal that is cyclically transmitted between at least two ends of an optical medium and outputted from one of the ends of the optical medium after at least one transmission cycle via the optical medium, wherein each transmission of the inputted optical signal in a direction via the optical medium is carried out over a wavelength resource which is different from a wavelength resource used in a preceding transmission of the inputted optical signal in a direction via the optical medium.

BRIEF DESCRIPTION OF THE DRAWINGS

The present invention will be understood and appreciated more fully from the following detailed description, taken in conjunction with the drawings in which:

FIG. 2 is a simplified pictorial illustration of an optical signal delayed in the apparatus of FIG. 1;

FIG. 3 is a simplified pictorial illustration of another optical signal delayed in the apparatus of FIG. 1;

DETAILED DESCRIPTION OF PREFERRED EMBODIMENTS

Figure 1:
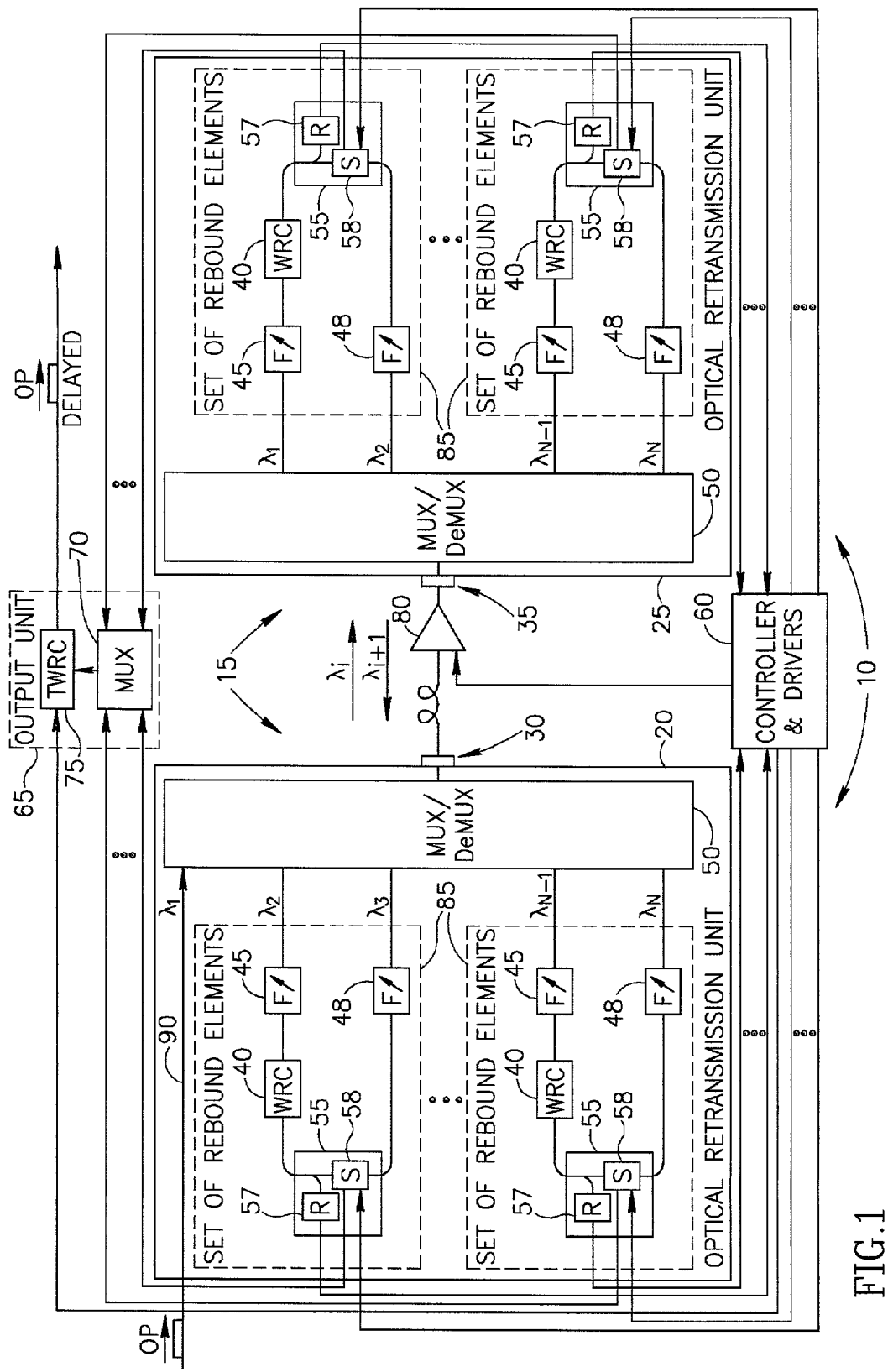
FIG. 1 is a simplified block diagram illustration of a preferred implementation of apparatus for optically delaying an optical signal, the apparatus being constructed and operative in accordance with a preferred embodiment of the present invention.

Reference is now made to FIG. 1 which is a simplified block diagram illustration of a preferred implementation of apparatus 10 for optically delaying an optical signal OP, the apparatus 10 being constructed and operative in accordance with a preferred embodiment of the present invention. As described hereinafter, the apparatus 10 preferably enables, either independently or under control of an external processing unit (not shown), to controllably delay the optical signal OP and to enable optical buffering and optical storage of the optical signal OP.

The apparatus 10 preferably includes optical retransmission units at at least two ends of an optical medium 15. For simplicity of depiction and description, and without limiting the generality of the foregoing, only two optical retransmission units 20 and 25 at two respective ends 30 and 35 of the optical medium 15 are shown by way of example in FIG. 1 and referred to herein below.

The optical retransmission units 20 and 25 preferably communicate with each other via the optical medium 15. The optical signal OP is preferably inputted at one of the optical retransmission units 20 and 25, for example and without limiting the generality of the foregoing, at the optical retransmission unit 20. Except for inputting of the optical signal OP that occurs only at one of the optical retransmission units 20 and 25, the optical retransmission units 20 and 25 are preferably similar in structure and functionality.

The optical medium 15 may preferably include at least one of the following: at least one fiber optic cable; at least one atmospheric path; a medium capable of slowing light; and at least one optical waveguide. It is appreciated that in actual applications, the optical medium 15 may additionally include elements and connection paths within the optical retransmission units 20 and 25. Therefore the optical medium 15 may include more than one type of optical medium, such as any combination of two or more of the following: a fiber optic cable; an atmospheric path; a medium capable of slowing light; and an optical waveguide.

In a case where the optical medium 15 includes at least one fiber optic cable, the at least one fiber optic cable typically includes at least one high-bandwidth fiber optic cable linking the optical retransmission unit 20 to the optical retransmission unit 25.

In a case where the optical medium 15 includes at least one atmospheric path, the at least one atmospheric path typically includes a path through the atmosphere between the optical retransmission units 20 and 25 in which case the optical retransmission units 20 and 25 communicate in wireless optical communication via the at least one atmospheric path.

In a case where the optical medium 15 includes a medium capable of slowing light, the medium capable of slowing light may include, for example and without limiting the generality of the foregoing, a medium in which a phenomenon of electromagnetically induced transparency (EIT) may be produced under appropriate conditions. For example, the medium in which EIT may be produced may include an environment of heated rubidium gas, enclosed for example in a gas cell, as described in the above mentioned newsbreak item entitled "Hot rubidium slows light speed to 90 m/s", in *Laser Focus World*, August 1999, page 11 the disclosure of which is incorporated herein by reference.

Alternatively, the medium in which EIT may be produced may include a cooled crystalline solid, such as a praseodymium-doped yttrium silicate crystal as described in the above mentioned article entitled "Crystal slows and stops light", by John Wallace in *Laser Focus World*, February 2002, Vol. 38, No. 2, pages 36–37 the disclosure of which is incorporated herein by reference.

In a case where the optical medium 15 includes at least one optical waveguide, the at least one optical waveguide may include a waveguide within a photonic integrated circuit or a waveguide within any suitable optical material. The at least one waveguide may also preferably include, as necessary, a fiber optic cable that is externally coupled to a waveguide within a photonic integrated circuit.

Preferably, the optical retransmission units 20 and 25 are operative to cyclically transmit the optical signal OP between the ends 30 and 35 of the optical medium 15 so that each transmission of the optical signal OP in a direction via the optical medium 15 is carried out over a wavelength resource which is different from a wavelength resource used in a preceding transmission of the optical signal OP in a direction via the optical medium 15. Each wavelength resource preferably includes at least one of the following: a wavelength; a lightpath; and a polarization direction over a wavelength.

Each of the optical retransmission units 20 and 25 preferably includes the following elements: at least one wavelength resource converter (WRC) 40; at least one input optical filter 45; at least one output optical filter 48; and a transmission multiplexer 50. One of the optical retransmission units 20 and 25, or both the optical retransmission units 20 and 25, may also preferably include, or be associated with, at least one switching element 55. Each switching element 55 preferably includes an optical receiver 57 and a two-stage optical switch 58.

The term "wavelength resource converter" is used throughout the specification and claims to include a wavelength converter, in a case where the wavelength resource is a wavelength, and a polarization converter such as a polarization controller in a case where the wavelength resource is a polarization direction over a wavelength. In a case where the wavelength resource is a lightpath, the wavelength resource converter may include a lightpath changer that changes the lightpath. The lightpath changer may include a combination of elements comprising at least one of the following: a wavelength converter; a polarization converter; and a router. The lightpath changer may preferably controllably activate the combination of elements to change the lightpath by performing at least one of the following: converting a wavelength in the lightpath; converting a polarization direction over a wavelength in the lightpath; and changing a light route.

Each input optical filter 45 is preferably operative to obtain a single replica of the optical signal OP that is carried over an input wavelength resource and to reject other replicas of the optical signal OP that are carried over other wavelength resources. Obtaining of the single replica of the optical signal OP that is carried over the input wavelength resource is preferably performed by filtering at least one received replica of the optical signal OP. Throughout the specification and claims the terms "optical signal" and "replica of the optical signal" are interchangeably used to include an inputted optical signal and any replicas of the inputted optical signal that may be carried over similar or different wavelength resources.

Each WRC 40 is preferably operative to convert an input wavelength resource, over which an obtained single replica of the optical signal OP is carried, into an output wavelength resource. Each output optical filter 48 is then preferably operative to retransmit the obtained single replica of the optical signal OP over the output wavelength resource and to reject other replicas of the optical signal OP that are carried over other wavelength resources.

Each transmission multiplexer 50 may include, for example, a conventional wavelength division multiplexer and may preferably be operative to provide the optical signal OP to the optical medium 15 in a multiplexed form. Each transmission multiplexer 50 may also serve as a demultiplexer as is well known in the art.

In the optical retransmission unit 20, each WRC 40 is preferably operatively associated with an input optical filter 45 and an output optical filter 48. Each input optical filter 45 and output optical filter 48 in the optical retransmission unit 20 is preferably operatively associated with the transmission multiplexer 50 in the optical retransmission unit 20 which in its turn is operatively associated with the end 30 of the optical medium 15. Similarly, in the optical retransmission unit 25, each WRC 40 is preferably operatively associated with an input optical filter 45 and an output optical filter 48. Each input optical filter 45 and output optical filter 48 in the optical retransmission unit 25 is preferably operatively associated with the transmission multiplexer 50 in the optical retransmission unit 25 which in its turn is operatively associated with the end 35 of the optical medium 15.

By way of example, each WRC 40 associated with an output optical filter 48 in both the optical retransmission units 20 and 25 depicted in FIG. 1 is operatively associated with the output optical filter 48 via a switching element 55. However, it is appreciated that the apparatus 10 may be operative with a single switching element 55 operatively associating a WRC 40 and an output optical filter 48 in one of the optical retransmission units 20 and 25, such as the optical retransmission unit 20. The single switching element 55 may be preferred in order to reduce costs and in a case where only a coarse distribution of optical delays of the optical signal OP is sufficient.

The apparatus 10 may further preferably include a controller 60 and an output unit 65. The controller 60 is preferably operatively associated with the optical receiver 57 and the two-stage switch 58 in each switching element 55. The controller 60 may preferably include suitable drivers for activating switching of the switch 58 between the two stages. One of the two stages of the switch 58 enables transmission of the optical signal OP to an output optical filter 48 associated with the switching element 55 and blocks transmission of the optical signal OP to the output unit 65. The other stage of the switch 58 blocks transmission of the optical signal OP to the output optical filter 48 associated with the switching element 55 and enables transmission of the optical signal OP to the output unit 65.

When transmission of the optical signal OP to the output unit 65 is enabled after at least one transmission cycle of the optical signal OP via the optical medium 15, the output unit 65 receives a delayed replica of the optical signal OP. It is appreciated that the controller 60 preferably enables transmission of the optical signal OP to the output unit 65 by switching a single switch 58 in a switching element 55 to the stage in which transmission of the optical signal OP to the output unit 65 is enabled based on an output at the receiver 57 in the switching element 55 and after the at least one transmission cycle of the optical signal OP via the optical medium 15.

The output unit 65 is preferably operatively associated with at least one of the optical retransmission units 20 and 25, and preferably with both the optical retransmission units 20 and 25. Preferably, the output unit 65 includes an output multiplexer 70 and an optional tunable wavelength resource converter (TWRC) 75. The output multiplexer 70 is preferably operatively associated with some or all switching elements 55 in the apparatus 10 and is operative to output the delayed replica of the optical signal OP provided via a switching element 55 after at least one transmission cycle of the optical signal OP via the optical medium 15. The output multiplexer 70 may include, for example, a conventional wavelength division multiplexer. The output multiplexer 70 may also serve as a demultiplexer as is well known in the art.

The TWRC 75 is preferably operatively associated with the output multiplexer 70 and is operative to convert an output wavelength resource over which the optical signal OP is outputted from the output multiplexer 70 into a selected wavelength resource in a case where such conversion is required. It is appreciated that the controller 60 may perform a selection of the selected wavelength resource and control the TWRC 75 for converting the wavelength resource into the selected wavelength resource.

The TWRC 75 may preferably include a conventional tunable wavelength converter for converting a wavelength resource that includes a wavelength, or a conventional tunable polarization converter such as a conventional polarization controller for converting a wavelength resource that includes a polarization direction over a wavelength. For converting a wavelength resource that includes a lightpath the TWRC 75 may preferably include either one of a tunable wavelength converter and a tunable polarization converter or a combination of both a tunable wavelength converter and a tunable polarization converter.

The apparatus 10 may also preferably include an optical amplifier 80 that may preferably include a Raman amplifier that amplifies an optical signal by using Raman amplification. The amplifier 80 is preferably operative to amplify the optical signal OP while traversing the optical medium 15 as necessary under control of the controller 60. For example, the controller 60 may activate the optical amplifier 80 if it receives in advance a message indicating that the optical signal OP inputted to the apparatus 10 requires amplification. It is appreciated that each WRC 40 may also include signal amplification functionality in which case the optical amplifier 80 is optional.

It is however appreciated that the optical signal OP may alternatively require power reduction on input to the apparatus 10 in which case the optical signal OP may be attenuated by an optical attenuator (not shown) prior to inputting to the apparatus 10. The optical attenuator may include, for example, a variable optical attenuator (VOA) that may adaptively attenuate the optical signal OP. The controller 60 may, for example, control the optical attenuator. By controlling the optical amplifier 80 and the optical attenuator the controller 60 may, in fact, monitor the optical signal OP power.

The apparatus 10 may additionally include dispersion compensation means (not shown) that are operative to compensate for dispersion of the optical signal OP while traversing the optical medium 15. The dispersion compensating means, that may for example employ tunable dispersion compensation, may preferably compensate for at least one of the following while the optical signal OP traverses the optical medium 15: chromatic mode dispersion; and polarization mode dispersion. The dispersion compensation means may operate continuously, or alternately every time the optical signal OP traverses a certain distance through the optical medium 15. It is appreciated that the dispersion compensation means may be optional in a case where the optical medium 15 includes at least one fiber optic cable and the at least one fiber optic cable includes a dispersion-shifted fiber optic cable.

In a case where the optical medium 15 includes a medium capable of slowing light as mentioned above, the apparatus 10 may also preferably include means (not shown) for applying the conditions that enable the medium to slow light, such means including, for example, heating or cooling means as necessary, and laser sources that generate coupling beams, probe beams and auxiliary beams that are typically used to produce EIT.

By way of example, and without limiting the generality of the foregoing, the optical medium 15 depicted in FIG. 1 is a fiber optic cable linking the optical retransmission units 20 and 25, and any operative association among elements in the apparatus 10 is made via fiber optic cables or waveguides.

In each of the optical retransmission units 20 and 25, a combination of an input optical filter 45, a WRC 40, a switching element 55 and an output optical filter 48 that are serially operatively associated is referred to as a set of rebound elements 85 because when operating together they cause retransmission of an inputted optical signal. Each set of rebound elements 85 or a plurality of sets of rebound elements 85 may be embodied, for example, in a single photonic integrated circuit.

Preferably, the apparatus 10 may be operative with a single set of rebound elements 85 in each of the optical retransmission units 20 and 25 and even with a single set of rebound elements 85 in only one of the optical retransmission units 20 and 25. However, by employing a plurality of sets of rebound elements 85 in each of the optical retransmission units 20 and 25 flexibility and operability of the apparatus 10 may be enhanced as described herein below.

In operation, after the optical signal OP is inputted to the apparatus 10, the optical signal OP is preferably transmitted back and forth via the optical medium 15 between a set of rebound elements 85 in the optical retransmission unit 20 and a set of rebound elements 85 in the optical retransmission unit 25 until it is outputted via a switching element 55 in one of the optical retransmission units 20 and 25. The optical signal OP may be transmitted a plurality of times in back and forth transmission cycles via the optical medium 15 in a case where a plurality of sets of rebound elements 85 are employed in each of the optical retransmission units 20 and 25, and also in certain cases when a single set of rebound elements 85 is employed in each of the optical retransmission units 20 and 25. Each transmission of the optical signal OP in a direction via the optical medium 15 between a set of rebound elements 85 in the optical retransmission unit 20 and a set of rebound elements 85 in the optical retransmission unit 25 is preferably carried out over a wavelength resource which is different from a wavelength resource used in a preceding transmission of the optical signal OP in a direction via the optical medium 15.

It is appreciated that prior to inputting the optical signal OP to the apparatus 10, the optical signal may preferably be scrambled in a scrambler (not shown) using a scrambling function. Scrambling of the optical signal OP is preferably used to prevent occurrence of long strings of ones or zeros as mentioned, for example, in Chapter 39 on pages 542–553 in *The Communications Handbook*, CRC Press & IEEE Press, 1997, Editor-in-Chief Jerry D. Gibson the disclosure of which is incorporated herein by reference.

A delay experienced by an optical signal traversing an optical medium is actually the time it takes the optical signal to traverse the optical medium. The time it takes the optical signal to traverse the optical medium can be calculated by dividing the total distance through the optical medium traversed by the optical signal by the speed of light in the optical medium. Therefore, each transmission of the optical signal OP in a direction via the optical medium 15 between a set of rebound elements 85 in the optical retransmission unit 20 and a set of rebound elements 85 in the optical retransmission unit 25 generates an added delay which is a result of a division of the length of the optical medium 15 by the speed of light in the optical medium 15. The length of the optical medium 15 may be equal to the distance between the optical retransmission units 20 and 25, but it does not necessarily have to be so.

In a case where the optical medium 15 comprises sections in which the speed of light is different, the time it takes the optical signal to traverse the optical medium 15 is calculated as the sum of times it takes the optical signal to traverse each section.

The added delay multiplied by a number of transmissions of the optical signal OP in a direction via the optical medium 15 results in a total delay experienced by the optical signal OP in the apparatus 10. The controller 60 or an external processing unit (not shown) may thus determine the number of transmissions of the optical signal OP in a direction via the optical medium 15 for controllably delaying the optical signal OP and enabling optical buffering of the optical signal OP.

It is appreciated that multiple transmissions of the optical signal OP via the optical medium 15 have characteristics that are similar to transmission characteristics of conventional wavelength division multiplexing (WDM) transmission systems. Thus, the number of different wavelength resources that may be used in the apparatus 10 is at least comparable to a number of different wavelengths that may be used in a conventional WDM transmission system. Similarly, a transmission range that may be obtained by using the apparatus 10 is at least comparable to a transmission range obtained in a conventional WDM transmission system.

As is well known in the art, conventional WDM transmission systems operate with various numbers of wavelengths ranging from four to more than a hundred. Transmission ranges obtained by WDM transmission systems may reach thousands of kilometers as reported, for example, in the above-mentioned article entitled "Mining the Optical Bandwidth for a Terabit per Second", by Alan Eli Willner in *IEEE Spectrum*, April 1997, pages 32–41, and in Chapter 65 on pages 883–890 in *The Communications Handbook*, CRC Press & IEEE Press, 1997, Editor-in-Chief Jerry D. Gibson the disclosures of which are incorporated herein by reference. Transmission ranges obtained by WDM transmission systems with regenerated transmission may reach tens of thousands kilometers and beyond.

It is appreciated that when a plurality of sets of rebound elements 85 are employed in the apparatus 10, each of the plurality of WRCs 40 in the plurality of sets of rebound elements 85 preferably converts a wavelength resource of the optical signal OP arriving thereat into a different converted wavelength resource. Wavelength components of all converted wavelength resources may belong to a single available wavelength band or a plurality of available wavelength bands. An available wavelength band may be any appropriate wavelength band such as, for example and without limiting the generality of the foregoing, one of the following: the S-Band, typically between 1488 nanometer (nm) and 1518 nm; the C-Band, typically between 1526 nm and 1563 nm; and the L-Band, typically between 1569 nm and 1613 nm.

Operation modes of the apparatus 10 are now briefly described with reference to the optical signal OP as using a first wavelength resource when inputted along a path 90 into the apparatus 10. For simplicity of description and depiction, and without limiting the generality of the foregoing, only wavelength resources that include wavelengths are referred to herein below, and the first wavelength resource is referred to as a carrier wavelength $\lambda_1$.

A first operation mode of the apparatus 10 is applicable regardless of the length of the optical signal OP that is fed to the apparatus 10. The first operation mode may also be applied with any number of sets of rebound elements 85 in any one of the optical retransmission units 20 and 25 provided that a minimum of one set of rebound elements 85, preferably in the optical retransmission unit 25, is maintained.

The term "length of an optical signal" is used throughout the specification and claims to refer to the duration or time span of the optical signal in an optical medium in which the optical signal propagates. A multiplication of the length of the optical signal by the speed of light in the optical medium gives the space coordinate span of the optical signal along the optical medium.

In the first operation mode, a wavelength over which the optical signal OP is carried is used only in a single entire transmission of the optical signal OP in a direction via the optical medium 15 before the optical signal OP is outputted from the apparatus 10. Thus, in a case where, for example, the apparatus 10 uses the minimum number of sets of rebound elements 85, that is one set of rebound elements 85 in the optical retransmission unit 25 only, the optical signal OP initially inputted at the optical retransmission unit 20 is preferably transmitted to the optical retransmission unit 25 over $\lambda_1$ and returned by the optical retransmission unit 25 to the optical retransmission unit 20 over a carrier wavelength $\lambda_2$ which is different from $\lambda_1$. The optical signal OP carried over $\lambda_2$ is then preferably outputted from the optical retransmission unit 20, for example over the path 90 in the absence of switching elements 55 in the optical retransmission unit 20. The optical signal OP is therefore outputted after one transmission cycle only via the optical medium 15 and each of the wavelengths $\lambda_1$ and $\lambda_2$ is used only in a single entire transmission of the optical signal OP in a direction via the optical medium 15 before the optical signal OP is outputted from the apparatus 10.

Thus, in the first operation mode when the apparatus 10 uses the minimum number of sets of rebound elements 85, any optical signal inputted over $\lambda_1$ is outputted as a delayed replica carried over $\lambda_2$. Transmission via the optical medium 15 in such a case may be referred to as WDM transmission that uses two wavelengths.

In a case where the apparatus 10 uses KS sets of rebound elements 85 in each of the optical retransmission units 20 and 25, where KS is an integer greater than or equal to one, and each set of rebound elements 85 in each of optical retransmission units 20 and 25 feeds the optical signal OP to the optical medium 15 over a different wavelength resource, the optical signal OP may preferably be outputted after a maximum of KS transmission cycles via the optical medium 15 without using a wavelength resource more than once. It is noted that a transmission in a direction via the optical medium 15 equals half a transmission cycle and thus the KS transmission cycles equal 2*KS transmissions in a direction via the optical medium 15. Since each set of rebound elements 85 receives the optical signal OP over one wavelength and outputs the optical signal OP over another wavelength, the number of wavelengths N that is used in such a case equals 2* KS. Transmission via the optical medium 15 in such a case may therefore be referred to as WDM transmission that uses i wavelengths, where 1<i≦N.

It is appreciated that use of a plurality of switching elements 55 in the apparatus 10 enables to output the optical signal OP after each transmission in a direction via the optical medium 15 or after each transmission cycle and not necessarily after the entire KS transmission cycles. The ability to output the optical signal OP after each transmission in a direction via the optical medium 15 or after each transmission cycle increases the number of discrete delay values that can be provided by the apparatus 10.

The apparatus 10 therefore provides both wavelength conversion and delay of an inputted optical signal as required, for example, for resolving bandwidth contention in optical switching applications. In the case where the apparatus 10 uses the minimum number of sets of rebound elements 85, a delay provided by the apparatus 10 is proportional to twice the length of the optical medium 15. Assuming, for comparison with conventional configurations of fiber delay lines (FDLs) and wavelength converters that are common in optical communication switches, that the optical medium 15 is a fiber optic cable, the delay provided by the apparatus 10 is superior to delays provided by the conventional configurations of FDLs and wavelength converters because a delay of an optical signal in a conventional FDL is proportional only to a length of the FDL since the optical signal traverses the FDL only once in a single direction.

In the case where the apparatus 10 uses the KS sets of rebound elements 85 in each of the optical retransmission units 20 and 25, a maximum delay provided by the apparatus 10 is proportional to the length of the optical medium 15 multiplied by 2*KS. Assuming again that the optical medium 15 is a fiber optic cable, the maximum delay provided by the apparatus 10 is also superior to delays provided by conventional configurations of FDLs and wavelength converters that are common in optical communication switches.

FIG. 2 depicts an example of the optical signal OP delayed in the apparatus 10 when the apparatus 10 is used in the first operation mode. The different filling types of the optical signal OP that are depicted in FIG. 2 refer only to different wavelengths over which the optical signal OP is carried.

A second operation mode of the apparatus 10 enables using any wavelength over which the optical signal OP is carried in more than one entire transmission in a direction via the optical medium 15 under constraints on the length of the optical signal OP as described herein below.

In the second operation mode, after the optical signal OP is transmitted back and forth between the optical retransmission units 20 and 25 a plurality of times each time over a different wavelength selected typically serially from a set of N wavelengths $\lambda_1, \ldots, \lambda_N$, the set of N wavelengths $\lambda_1, \ldots, \lambda_N$ may be reused for transmission of the optical signal OP between the optical retransmission units 20 and 25. In such a case, when the optical signal OP reaches transmission over the last wavelength $\lambda_N$, the last wavelength $\lambda_N$ may be converted by the corresponding WRC 40 into $\lambda_1$ thereby initiating reuse of the set of wavelengths $\lambda_1, \ldots, \lambda_N$. The wavelengths $\lambda_1, \ldots, \lambda_N$ are therefore used in a loop that may be repeated a plurality of times, each time lengthening the delay experienced by the optical signal OP. The loop includes N/2 transmission cycles via the optical medium 15 or N transmissions in a direction via the optical medium 15.

When using the wavelengths $\lambda_1, \ldots, \lambda_N$ in a loop that is repeated a plurality of times as mentioned above, it is preferred to avoid override interference effects in which a tail of the optical signal OP that did not yet finish a first repetition of the loop interferes with or is overridden by a head of the optical signal OP that already started a second repetition of the loop. Such override interference effects may occur when the optical signal OP is long enough to have its tail carried, for example, over $\lambda_1$ in the first repetition of the loop while its head is carried over the same wavelength $\lambda_1$ in the second repetition of the loop.

In order to avoid such override interference effects, the length of the optical signal OP must not exceed a maximum length TOS that is obtained by equation (1) that follows:

$$TOS=N*LOM/v-LGP \qquad (1)$$

where LOM is the length of the optical medium 15, v is the speed of light in the optical medium 15, and LGP is a length of a guard period guarding against the override interference effects.

For example, if N=4, LOM=1000 meters, the optical medium 15 is a fiber optic cable in which v=200000 km/sec, and LGP=10 μsec, equation (1) gives TOS=0.00001 seconds (10 μsec). In a case where the optical signal OP is provided, for example, at a bit-rate of 10 gigabit per second (Gbit/s), the optical signal OP at its maximum length of 0.00001 seconds may include 100000 bits (100 Kbits) of information. It is appreciated that the 100 Kbits of the optical signal OP may, for example, be provided as one or more optical packets of variable length, also known as bursts, or optical packets of fixed length.

The number of sets of rebound elements 85 in each of the optical retransmission units 20 and 25 that is needed to provide the N wavelengths $\lambda_1, \ldots \lambda_N$ is N/2. Thus, in the example mentioned above, two sets of rebound elements 85 are needed in each of the optical retransmission units 20 and 25 to enable delaying of 100 Kbits of data in a loop that is repeated a plurality of times. It is appreciated that within each repetition of the loop, and within each transmission cycle in the loop, the optical signal OP may preferably be sent to the output unit 65 for output either by the optical retransmission unit 20 or the optical retransmission unit 25.

In addition to its role of guarding against the override interference effects, the guard period has another important role in determining when to provide the optical signal OP to the output unit 65. This additional role of the guard period imposes constraints on the length of the guard period as described herein below. The length of the guard period cannot therefore be determined only by mere separation between the head of the optical signal OP in a repetition of the loop and the tail of the optical signal OP in a preceding repetition of the loop that could, in principle, be reduced to almost zero in order to increase TOS.

Referring, to the example mentioned above and to a required delay of the optical signal OP that is eventually obtained by delaying the optical signal OP in a loop that is repeated LRN times where LRN is an integer greater than one, it may be necessary to determine, within the last repetition of the loop, when to provide the optical signal OP to the output unit 65. It is appreciated that by inputting the required delay to the controller 60, the controller 60 may determine, for example by using an internal clock (not shown), LRN and a measurable time period within which the last repetition of the loop is carried out.

In order to determine when to provide the optical signal OP to the output unit 65 within the last repetition of the loop, the controller 60 may preferably activate the optical receiver 57 in the switching element 55 in the second set of rebound elements 85 in the optical retransmission unit 20. When activated, the optical receiver 57 may, for example, detect a portion of the guard period at the beginning of the guard period by detecting a period of time within which no optical signal is detected. In this regard it is worth noting that scrambling of the optical signal OP prior to inputting into the apparatus 10 as mentioned above typically prevents occurrence of long strings of ones or zeros and thus detection of the period of time within which no optical signal is detected is typically representative of the guard period.

When the controller 60 determines that the optical receiver 57 detected the portion of the guard period at the beginning of the guard period, the controller 60 may preferably activate the switch 58 in the switching element 55 in the second set of rebound elements 85 in the optical retransmission unit 20 to enable transmission of the optical signal OP to the output unit 65. Preferably, activation of the optical switch 58 to enable transmission of the optical signal OP to the output unit 65 must end before the end of the guard period in order to enable the output unit 65 to receive the entire optical signal OP from its beginning. If the optical switch 58 were to start enabling transmission of the optical signal OP to the output unit 65 after the end of the guard period, the output unit 65 would have not received the entire optical signal OP from its beginning.

It is therefore appreciated that performance times of the following processes impose limits on the length of the guard period: detection by the optical receiver 57 of the portion of the guard period at the beginning of the guard period; determination by the controller 60 that the optical receiver 57 detected the portion of the guard period at the beginning of the guard period and instructing the switch 58 to switch from one state to another; and switching time of the switch 58. Of these performance times, switching time of the switch 58 is typically the longest. The guard period must therefore be somewhat longer than the switching time of the switch 58.

Thus, in the example mentioned above the length of 10 μsec of the guard period is enabled when the switch 58 which is responsible for transmission of the optical signal OP to the output unit 65 has a switching time which is somewhat less than 10 μsec. Such a switching time, and even much shorter switching times of the order of magnitude of nano-seconds, are attainable today by a variety of devices, such as, for example, electroholographic switches and solid-state switching devices that are based on a semiconductor optical amplifier (SOA). Electroholographic switches are described, for example, in the above-mentioned article entitled "Electroholographic switches are fast and compact", by Aharon J. Agranat in *Laser Focus World*, May 2001, pages 109–112 the disclosure of which is incorporated herein by reference. SOA based switching devices are described, for example, in the above-mentioned newsbreak item entitled "Switch based on SOA achieves femtosecond switching", in *Laser Focus World*, September 2001, page 9, and in the above-mentioned article entitled "Next-generation networks may benefit from SOAs", by Martin Young in *Laser Focus World*, September 2001, pages 73–79 the disclosures of which are incorporated herein by reference.

FIG. 3 depicts an example of the optical signal OP delayed in the apparatus 10 when the apparatus 10 is used in the second operation mode and in a case where the length of the optical signal OP does not exceed the maximum length TOS. The different filling types of the optical signal OP that are depicted in FIG. 3 refer only to different wavelengths over which the optical signal OP is carried.

It is therefore appreciated that the optical signal OP may be delayed in the apparatus 10 in a loop that includes a plurality of transmission cycles via the optical medium 15 and is repeated a plurality of times. The apparatus 10 therefore enables delaying of the optical signal OP for delay periods that by far exceed delay periods enabled by conventional FDLs.

Throughout each transmission in a direction via the optical medium 15, or once in a few transmission cycles, the optical signal OP undergoes in fact a regeneration process. Additionally, due to usage of the dispersion compensation means or a dispersion-shifted fiber optic cable, dispersion in each transmission in a direction via the optical medium 15, or once in a few transmission cycles, is minimized. Therefore, a total transmission range that may be attained by the apparatus 10 may be at least comparable to and even by far exceed transmission ranges that may be attained by conventional WDM transmission systems that use signal regenerators.

Referring back to the example mentioned above, the number of loop repetitions LRN may be taken to be equal to one thousand (1000) in order to attain a total transmission range of 4000 km which is well within transmission ranges attained by conventional WDM transmission systems that use signal regenerators. The delay generated by the one thousand loop repetitions for the 100 Kbits optical signal is 0.02 seconds (20 mSec). Such a delay may, for example, well serve for resolving bandwidth contention in switching applications.

It is appreciated that the example given above is not to be considered as limiting. Delays much longer than 20 mSec may be obtained using the apparatus 10 by, for example, increasing the total transmission range through an increase in the number of loop repetitions LRN or an increase of LOM, and/or replacing the optical medium 15 by a medium capable of slowing light. Additionally, optical signals whose lengths are longer than in the example given above may be delayed using the apparatus 10 by performing, for example, at least one of the following operations: increasing LOM; increasing N; lowering LGP; and replacing the optical medium 15 by a medium capable of slowing light.

Figure 4:
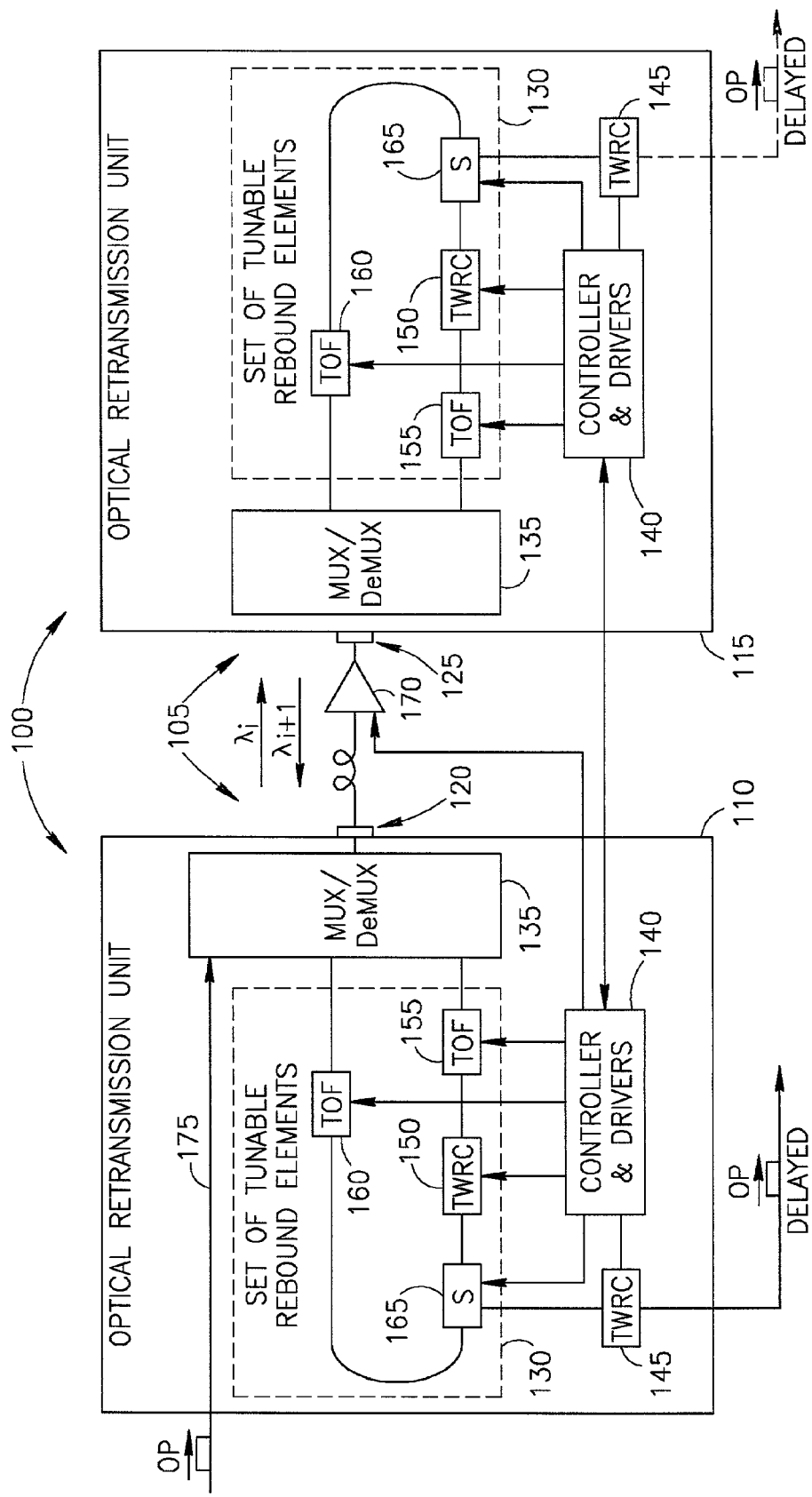
FIG. 4 is a simplified block diagram illustration of another preferred implementation of apparatus for optically delaying an optical signal, the apparatus being constructed and operative in accordance with a preferred embodiment of the present invention.

Reference is now additionally made to FIG. 4 which is a simplified block diagram illustration of another preferred implementation of apparatus 100 for optically delaying an optical signal such as the optical signal OP, the apparatus 100 being constructed and operative in accordance with a preferred embodiment of the present invention. As described hereinafter, the apparatus 100 preferably enables, either independently or under control of an external processing unit (not shown), to controllably delay the optical signal OP and to enable optical buffering and optical storage of the optical signal OP.

The apparatus 100 may provide functionality that is similar to the functionality of the apparatus 10 but with fewer elements. Preferably, the apparatus 100 includes, similarly to the apparatus 10, optical retransmission units at at least two ends of an optical medium 105 that may be similar to the optical medium 15. For simplicity of depiction and description, and without limiting the generality of the foregoing, only two optical retransmission units 110 and 115 at two respective ends 120 and 125 of the optical medium 105 are shown by way of example in FIG. 4 and referred to herein below. The optical retransmission units 110 and 115 preferably communicate with each other via the optical medium 105.

Each of the optical retransmission units 110 and 115 preferably includes the following units: a single set of tunable rebound elements 130; a transmission multiplexer 135; a controller 140; and an output unit that includes a TWRC 145. The set of tunable rebound elements 130 in each of the optical retransmission units 110 and 115 preferably includes the following elements: a TWRC 150; an input tunable optical filter (TOF) 155; an output TOF 160; and a switching element 165. The switching elements 165 are preferably similar in structure and functionality to the switching elements 55 in the apparatus 10.

The controller 140 in the optical retransmission unit 110 may also preferably include drivers for operating the switching element 165 in the optical retransmission unit 110 and for tuning the TWRC 150, the input TOF 155 and the output TOF 160 in the optical retransmission unit 110. Similarly, the controller 140 in the optical retransmission unit 115 may also preferably include drivers for operating the switching element 165 in the optical retransmission unit 115 and for tuning the TWRC 150, the input TOF 155 and the output TOF 160 in the optical retransmission unit 115. The controllers 140 in the optical retransmission units 110 and 115 are preferably operatively associated with each other for synchronizing operation of each switching element 165 and for tuning each TWRC 150, each input TOF 155 and each output TOF 160. One of the controllers 140 may also preferably control an amplifier 170 that may preferably be used to amplify as necessary optical signals communicated via the optical medium 105. The amplifier 170 may be, for example, a Raman amplifier.

The transmission multiplexers 135 are preferably similar in structure and functionality to the transmission multiplexers 50. Each transmission multiplexer 135 may also serve as a demultiplexer as is well known in the art.

The optical signal OP is preferably inputted at one of the optical retransmission units 110 and 115, for example and without limiting the generality of the foregoing, over a path 175 at the optical retransmission unit 110. Except for inputting of the optical signal OP that occurs only at one of the optical retransmission units 110 and 115, the optical retransmission units 110 and 115 are preferably similar in structure and functionality. Preferably, the optical signal may be scrambled in a scrambler (not shown) using a scrambling function prior to inputting the optical signal OP at the optical retransmission unit 110.

In operation, the optical signal OP is preferably transmitted back and forth via the optical medium 105 between a set of rebound elements 130 in the optical retransmission unit 110 and a set of rebound elements 130 in the optical retransmission unit 115 until it is outputted via a switching element 165 and a TWRC 145 in one of the optical retransmission units 110 and 115. The optical signal OP may be transmitted a plurality of times in back and forth transmission cycles via the optical medium 105.

Each transmission of the optical signal OP in a direction via the optical medium 105 between a set of rebound elements 130 in the optical retransmission unit 110 and a set of rebound elements 130 in the optical retransmission unit 115 is preferably carried out over a wavelength resource which is tuned to by a TWRC 150 in one of the optical retransmission units 110 and 115. Additionally, each transmission of the optical signal OP in a direction via the optical medium 105 between a set of rebound elements 130 in the optical retransmission unit 110 and a set of rebound elements 130 in the optical retransmission unit 115 is preferably carried out over a wavelength resource which is different from a wavelength resource used in a preceding transmission of the optical signal in a direction via the optical medium 105.

The apparatus 100 may operate in operations modes that are similar to the operation modes of the apparatus 10 provided both following requirements are satisfied:

(1) Tuning times of the TWRC 150, the TOF 155 and the TOF 160 in each set of tunable rebound elements 130 are shorter than or equal to the time it takes to the optical signal OP to travel in a direction via the optical medium 105 from one of the optical retransmission units 110 and 115 to the other, such time being referred to hereinafter as the travel time of the optical signal OP; and (2) The length of the optical signal OP is shorter than or equal to the travel time of the optical signal OP.

The reason for the requirements mentioned above is that tuning of any tunable element in any one of the sets of tunable rebound elements 130 from a first state to a second state must be made so as to render the tunable element ready and operative in the second state before next arrival of the optical signal OP and after the entire optical signal OP exited the tunable element tuned to the first state.

Tuning time of a conventional TOF may be of the order of magnitude of a hundred microseconds (100 µSec) and tuning time of a conventional TWRC is typically shorter than the tuning time of a conventional TOF. In such a case, the travel time of the optical signal OP must be longer than or equal to 100 µSec. Such a travel time may be achieved in the apparatus 100, for example, in a case where the optical medium 105 includes a 20 km long fiber optic cable, or a couple of crystals that slow light as described in the above-mentioned article entitled "Crystal slows and stops light", by John Wallace in *Laser Focus World*, February 2002, Vol. 38, No. 2, pages 36–37 the disclosure of which is incorporated herein by reference. The above-mentioned travel time may also be achieved in the apparatus 100, for example, in a case where the optical medium 105 includes a combination of the above-mentioned crystal that slows light and a fiber optic cable which is longer than 7 km. It is appreciated that the length of the optical medium 105 may be shortened as the tuning times of TOFs and TWRCs decrease.

The upper limit for the length of the optical signal OP is therefore 100 µSec for a tuning time of 100 µSec of the TOFs 155 and 160. Referring, for example, to a case in which the optical signal OP is provided at a bit-rate of 10 Gbit/s, the optical signal OP at its maximum length of 100 µSec may therefore include 1000000 bits (1 Mbits) of information. It is appreciated that the 1 Mbits of the optical signal OP may, for example, be provided as one or more optical packets of variable length, also known as bursts, or optical packets of fixed length.

The above mentioned requirements regarding the length of the optical signal OP and tuning times of the TWRC 150 and the TOFs 155 and 160 may be obviated in a special case where tuning functionality of the tunable elements in the apparatus 100 is frozen or not used. In such a case, operation of the apparatus 100 is similar to the operation of the apparatus 10 in a configuration in which only one set of rebound elements 85 is used in each of the optical retransmission units 20 and 25. The example depicted in FIG. 2 also applies in such a case as an example of an optical signal delayed in the apparatus 100.

It is appreciated that the example depicted in FIG. 3 also applies as an example of an optical signal delayed in the apparatus 100 if the above mentioned requirements regarding the length of the optical signal OP and tuning times of the TWRC 150 and the TOFs 155 and 160 are satisfied.

Common to all operation modes of the apparatus 10 and the apparatus 100 is that the optical signal OP is always received over one wavelength resource and retransmitted over another wavelength resource. The apparatus 10 and the apparatus 100 therefore utilize transmission mechanisms that are similar in principle to transmission mechanisms of conventional transmission systems such as WDM systems or frequency division multiplexing (FDM) systems.

It is appreciated that each of the apparatus 10 and the apparatus 100, regardless of the operation mode used, preferably outputs a delayed optical signal which is generated from an inputted optical signal that is cyclically transmitted between at least two ends of an optical medium and outputted from one of the ends of the optical medium after at least one transmission cycle via the optical medium. Each transmission of the inputted optical signal in a direction via the optical medium is carried out over a wavelength resource that is different from a wavelength resource used in a preceding transmission of the inputted optical signal in a direction via the optical medium. Interference among repeated transmissions of the inputted optical signal via the optical medium is thus minimized or even avoided.

Figure 5:
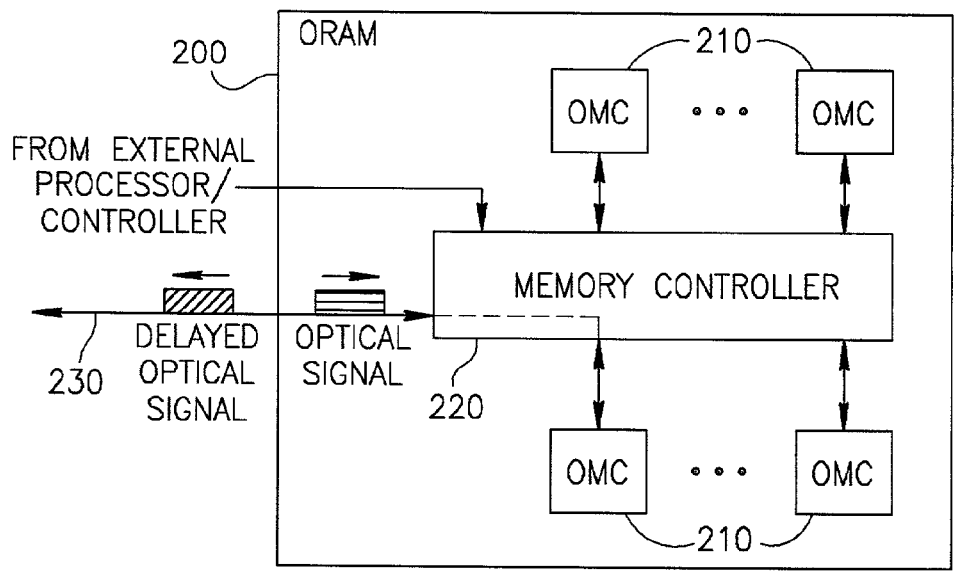
FIG. 5 is a simplified block diagram illustration of a preferred implementation of an optical memory constructed and operative in accordance with a preferred embodiment of the present invention.

The magnitudes of delays of the optical signal OP that can be obtained using the apparatus 10 or the apparatus 100 make the apparatus 10 and the apparatus 100 suitable for use in optical buffering applications and in optical storage applications such as optical random access memory (ORAM) applications. In such applications, the apparatus 10 or the apparatus 100 may serve as an optical buffer or an optical memory cell of an optical memory that stores an entire optical signal, where the optical signal includes a plurality of bits. Such an optical memory is depicted in FIG. 5 which is a simplified block diagram illustration of a preferred implementation of an optical memory constructed and operative in accordance with a preferred embodiment of the present invention. The optical memory in FIG. 5 is indicated by reference numeral 200.

Preferably, the optical memory 200 includes at least one optical memory cell (OMC) 210 and a memory controller 220. The at least one OMC 210 may preferably include a plurality of OMCs 210. Each OMC 210 may preferably include the apparatus 10 of FIG. 1 or the apparatus 100 of FIG. 4. The memory controller 220 is preferably operatively associated with the at least one OMC 210 and is operative to control storage in and retrieval from the at least one OMC 210.

The memory controller 220 may include, for example, a switch or a routing element (both not shown) that may preferably be controlled by an external processor/controller (not shown) or an internal controller (not shown) in the memory controller 220. Alternatively, the switch or the routing element may be controlled by a controller (not shown) embodied in the at least one OMC 210.

The switch or the routing element preferably routes an incoming optical signal to a selected OMC 210 for storage therein for a storage time determined by a delay that may be imposed on the incoming optical signal in the selected OMC 210. The memory controller 220 may also preferably use the switch or the routing element for retrieval of the optical signal at the end of the storage time in the selected OMC 210. Storage and retrieval of the optical signal may be carried out, for example, over a single optical path 230. Preferably, storage in and retrieval from the selected OMC 210 is performed in response to commands provided, for example by the external processor/controller.

The different filling types of the optical signal that are depicted in FIG. 5 refer only to different wavelengths over which the optical signal is carried.

Referring to the examples mentioned above with reference to FIGS. 1 and 4, each OMC 210 stores information amounting 100 Kbits or 1 Mbits respectively.

It is appreciated that, if necessary, delays beyond a delay provided by a single OMC 210 may be obtained, for example, by routing the optical signal from one OMC 210 to another so as to accumulate delays imposed on the optical signal by a plurality of OMCs 210. Such accumulation of delays may be determined, for example, by the external processor/controller and executed by the memory controller 220 that may direct the optical signal retrieved from one OMC 210 to another.

The OMCs 210 need not necessarily be similar to each other. For example, at least some OMCs 210 may use different sets of wavelength resources. Alternatively or additionally, at least some OMCs 210 may include optical mediums of different types and/or lengths. Thus, different storage times may be obtained using different OMCs 210 or different numbers of similar OMCs 210.

The optical memory 200 is preferably of an all-optical memory type in which optical signals are stored without having to perform optical-electronic-optical (O/E/O) conversions. The optical memory 200 may thus be used as an ORAM.

The magnitudes of the delays of the optical signal and storage capacities that can be obtained using the apparatus 10 or the apparatus 100 for each OMC 210 depend on the length of the optical medium used and on the speed of light in the optical medium. Thus, longer delays and higher storage capacities may be obtained, inter alia, by increasing the length of the optical medium or using a medium capable of slowing light.

In a case where the optical medium used in the apparatus 10 and the apparatus 100 is based on fiber optic cables, optical mediums of considerable lengths are typically available in infrastructure of conventional optical communication networks. Therefore, it may be advantageous to integrate the apparatus 10 or the apparatus 100 in an optical communication network. Integration of the apparatus 10 or the apparatus 100 in an optical communication network may be performed in different ways as described herein below.

Figure 6:
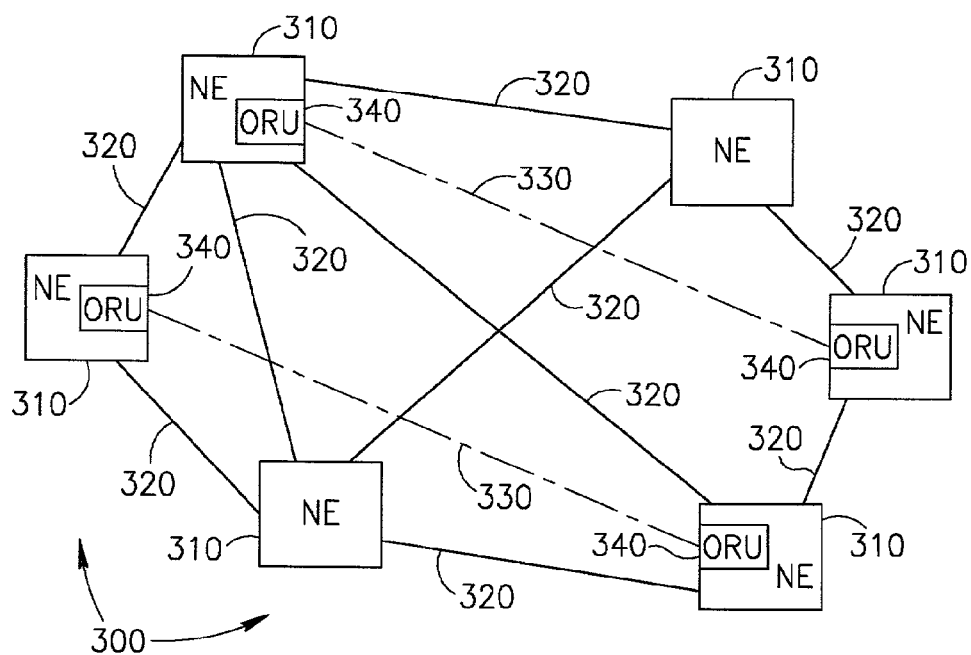
FIG. 6 is a simplified block diagram illustration of a preferred implementation of an optical communication network including network elements that utilize the apparatus of FIG. 1 or the apparatus of FIG. 4.

Reference is now additionally made to FIG. 6 which is a simplified block diagram illustration of a preferred implementation of an optical communication network 300 including network elements (NEs) 310 that utilize the apparatus 10 or the apparatus 100.

The NEs 310 are preferably operatively associated via fiber optic cables. Typically, telecommunication companies install more fiber optic cables than are normally needed in order to account for a future anticipated increase in communication traffic loads. Thus, not all fiber optic cables associating network elements of an optical communication network are normally active, and some network elements may be operatively associated via normally active fiber optic cables as well as via normally redundant fiber optic cables. The term "redundant fiber optic cable" is used throughout the specification and claims to include a fiber optic cable that is not normally used or is only partially used, such as for backup or for typically short term transmissions, such as management information transmissions.

In the example depicted in FIG. 6, the NEs 310 are operatively associated via normally active fiber optic cables 320. Additionally, four of the NEs 310 are also operatively associated via two normally redundant fiber optic cables 330. It is however appreciated that the present invention is not limited by the number of active and/or redundant fiber optic cables associating NEs of an optical communication network.

Preferably, each of the NEs 310 that are operatively associated via the fiber optic cables 330 includes an optical retransmission unit (ORU) 340 that is operatively associated with an end of a corresponding fiber optic cable 330. The ORU 340 may either include one of the optical retransmission units 20 and 25 of the apparatus 10 or one of the optical retransmission units 110 and 115 of the apparatus 100. Each couple of NEs 310 that are mutually associated via the fiber optic cables 330 therefore includes the apparatus 10 or the apparatus 100 with the fiber optic cable 330 associating the mutually associated NEs 310 serving as the optical medium 15 or the optical medium 105 respectively. In a case where any two mutually associated ORUs 340 are based on the optical retransmission units 20 and 25 of the apparatus 10, the controller 60 and the output unit 65 of the apparatus 10 may be embodied in a management system (not shown) of the optical communication network 300, or in one of the NEs 310 that includes one of the two mutually associated ORUs 340.

Such a configuration preferably enables using the existing redundant fiber optic cables 330 as an infrastructure for delaying optical signals that are typically communicated via the normally active fiber optic cables 320.

In operation, when an optical signal that is normally communicated between two NEs 310 via a fiber optic cable 320 must be delayed, a processor (not shown) in one of the two communicating NEs 310, or the management system may instruct a routing element (not shown) in one of the two communicating NEs 310 to switch the optical signal to an ORU 340. The ORU 340 may be comprised in one of the two communicating NEs 310 or in another NE 310.

The optical signal reaching the ORU 340 may be referred to as an input to the apparatus 10 or the apparatus 100 of which the ORU 340 forms part. The optical signal is thus delayed as in the apparatus 10 or the apparatus 100. After the optical signal is delayed, the processor in one of the two communicating NEs 310, or the management system may instruct the routing element to switch the optical signal back to the fiber optic cable 320 for communication over the fiber optic cable 320.

As mentioned above, in the optical communication network 300 delaying of optical signals is carried out using normally redundant fiber optic cables 330. However, delaying of optical signals may also be carried out using normally active fiber optic cables as described herein below with reference to FIG. 7.

Figure 7:
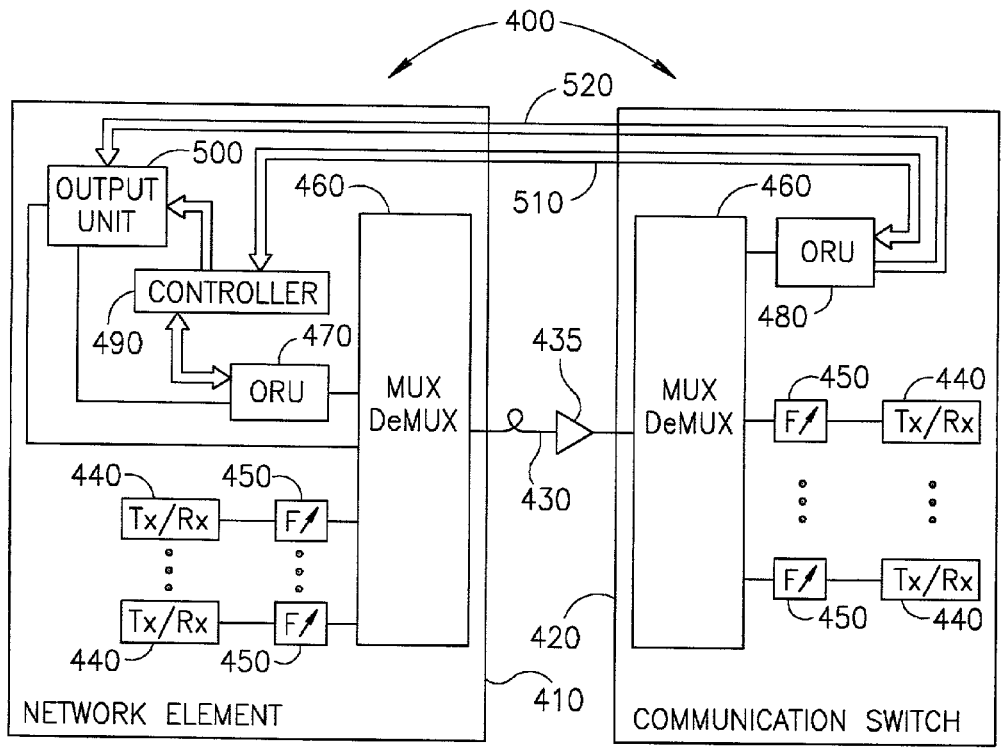
FIG. 7 is a simplified block diagram illustration of a preferred implementation of a portion of an optical communication network utilizing the apparatus of FIG. 1 or the apparatus of FIG. 4.

Reference is now additionally made to FIG. 7 which is a simplified block diagram illustration of a preferred implementation of a portion of an optical communication network 400 utilizing the apparatus 10 or the apparatus 100.

In the optical communication network 400, a network element (NE) 410 preferably communicates with another NE, such as a communication switch 420. The NE 410 and the communication switch 420 preferably communicate with each other via at least one normally active fiber optic cable 430 using WDM. An amplifier 435, such as a Raman amplifier, may preferably be used to amplify as necessary optical signals communicated via the fiber optic cable 430.

Each of the NE 410 and the communication switch 420 preferably includes the following conventional elements of a WDM system: optical transmitters/receivers (transceivers) 440; optical filters 450; and a wavelength division multiplexer/demultiplexer (MUX/DEMUX) 460. Typically, optical signals at different wavelengths that are generated, for example at the optical transceivers 440 in the NE 410, are communicated using WDM to the communication switch 420. At the communication switch 420, the optical signals received from the NE 410 are filtered by the optical filters 450 and detected by the optical transceivers 440. The communication switch 420 switches the optical signals detected at the optical transceivers 440 to appropriate destinations (not shown).

Communication in a direction from the communication switch 420 towards the NE 410 is carried out similarly to communication in a direction from the NE 410 to the communication switch 420 but in an opposite direction.

In a preferred embodiment of the present invention the apparatus 10 or the apparatus 100 may be integrated in the NE 410 and the communication switch 420. For example, the NE 410 may include an ORU 470 that is operatively associated with the MUX/DEMUX 460 in the NE 410, and the communication switch 420 may include an ORU 480 that is operatively associated with the MUX/DEMUX 460 in the communication switch 420. The ORU 470 may include, for example, the optical retransmission unit 20 of the apparatus 10 or the optical retransmission unit 110 of the apparatus 100. The ORU 480 may include, for example, the optical retransmission unit 25 of the apparatus 10 or the optical retransmission unit 115 of the apparatus 100. The at least one normally active fiber optic cable 430 preferably serves as the optical medium 15 or the optical medium 105 respectively.

In a case where the ORU 470 includes the optical retransmission unit 20 and the ORU 480 includes the optical retransmission unit 25, one of the NE 410 and the communication switch 420, such as the NE 410, may additionally include a controller 490 and an output unit 500. The controller 490 may preferably be similar in structure and functionality to the controller 60 and the output unit 500 may preferably be similar in structure and functionality to the output unit 65. The controller 490 and the output unit 500 may preferably be operatively associated with the ORUs 470 and 480 via links 510 and 520 other than the fiber optic cable 430.

In a case where the ORU 470 includes the optical retransmission unit 110 and the ORU 480 includes the optical retransmission unit 115, the ORUs 470 and 480 may preferably be operatively associated with each other via a link (not shown) other than the fiber optic cable 430 as in the apparatus 100.

In operation, the normally active fiber optic cable 430 may preferably be used in both communication of optical signals and delaying of optical signals. Preferably, each wavelength resource used by the ORUs 470 and 480 in a process of delaying optical signals includes a wavelength resource that is not normally used by the optical transceivers 440 for communication via the fiber optic cable 430. Similarly, each wavelength used by the optical transceivers 440 for communication via the fiber optic cable 430 is not normally used in the process of delaying optical signals. The wavelength resources used in the process of delaying optical signals may be obtained, for example by using conventional interleavers (not shown) that may be embodied in the NE 410 and the communication switch 420.

Alternatively, the ORUs 470 and 480 may employ wavelengths in a wavelength band other than a wavelength band used by the optical transceivers 440. For example, wavelengths in the C-Band may be employed by the optical transceivers 440 for communication between the NE 410 and the communication switch 420 and wavelengths in the S-Band may be employed by the ORUs 470 and 480 for delaying optical signals.

It is appreciated that the apparatus 10 or the apparatus 100 may be used, for example, in addition to a contention resolution unit or other means for resolving bandwidth contention in an optical packet switch to increase a delay of an optical signal. In such a case, an optical signal outputted from the contention resolution unit or from the means for resolving bandwidth contention may be inputted to the apparatus 10 or the apparatus 100 in order to further delay the optical signal. Contention resolution units are mentioned in U.S. patent application Ser. Nos. 09/944,603 and 10/057,991 to Handelman the disclosures of which are incorporated herein by reference. Means for resolving bandwidth contention in an optical packet switch are described in the above-mentioned article entitled "Approaches to Optical Internet Packet Switching", by Hunter et al in *IEEE Communications Magazine*, September 2000, pages 116–122 the disclosure of which is incorporated herein by reference.

Figure 8:
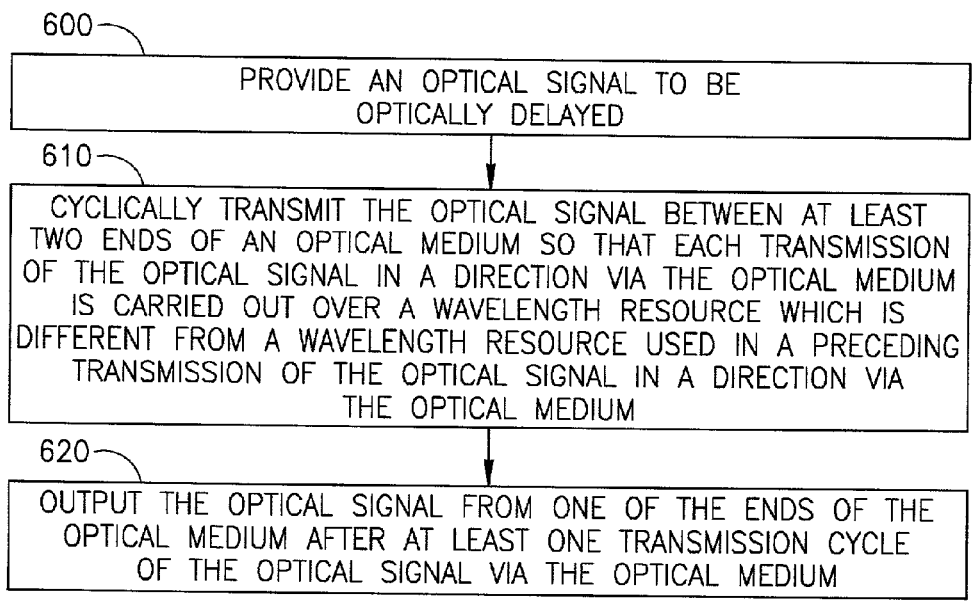
FIG. 8 is a simplified flowchart illustration of a preferred method of operation of the apparatus of FIGS. 1 and 4.

Reference is now made to FIG. 8 which is a simplified flowchart illustration of a preferred method of operation of the apparatus 10 of FIG. 1 and the apparatus 100 of FIG. 4.

An optical signal to be optically delayed is preferably provided (step 600). The optical signal is preferably cyclically transmitted (step 610) between at least two ends of an optical medium so that each transmission of the optical signal in a direction via the optical medium is carried out over a wavelength resource which is different from a wavelength resource used in a preceding transmission of the optical signal in a direction via the optical medium. The optical signal is preferably outputted (step 620) from one of the ends of the optical medium after at least one transmission cycle of the optical signal via the optical medium.

It is appreciated that various features of the invention that are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims that follow.

What is claimed is:

1. A method for optically delaying an optical signal, the method comprising:
   transmitting the optical signal back and forth between at least two ends of an optical medium in directions in the optical medium which are opposite to each other so that a transmission of the optical signal in a first direction via the optical medium is carried out over a wavelength resource which is different from a wavelength resource used in a preceding transmission of the optical signal in a direction via the optical medium which is opposite to the first direction, the transmitting comprises:
   obtaining a single replica of the optical signal that is carried over an input wavelength resource;
   converting said input wavelength resource into an output wavelength resource; and
   transmitting said single replica of the optical signal over said output wavelength resource; and
   outputting the optical signal from one of said ends of the optical medium after at least one back and forth transmission cycle of the optical signal via the optical medium.

2. The method according to claim 1 and wherein said optical medium comprises at least one of the following: at least one fiber optic cable; at least one atmospheric path; and at least one optical waveguide.

3. The method according to claim 1 and wherein said optical medium comprises a medium capable of slowing light, and the method also comprises applying conditions that enable said medium to slow light.

4. The method according to claim 1 and wherein said wavelength resource comprises at least one of the following: a wavelength; a lightpath; and a polarization direction over a wavelength.

5. The method according to claim 1 and also comprising scrambling the optical signal prior to said transmitting.

6. The method according to claim 1 and also comprising compensating for dispersion of the optical signal while traversing the optical medium.

7. The method according to claim 6 and wherein said compensating comprises compensating for at least one of the following while the optical signal traverses the optical medium: chromatic mode dispersion; and polarization mode dispersion.

8. The method according to claim 6 and wherein said compensating comprises employing tunable dispersion compensation for compensating for at least one of the following while the optical signal traverses the optical medium: chromatic mode dispersion; and polarization mode dispersion.

9. The method according to claim 1 and also comprising amplifying the optical signal while traversing the optical medium.

10. The method according to claim 1 and also comprising converting a wavelength resource over which said optical signal is outputted from said one of said ends of the optical medium into a selected wavelength resource.

11. The method according to claim 1 and wherein said obtaining comprises filtering at least one received replica of the optical signal.

12. Apparatus for optically delaying an optical signal, the apparatus comprising:
   optical retransmission units at at least two ends of an optical medium, the optical retransmission units being operative to transmit the optical signal back and forth between said at least two ends of the optical medium in directions in the optical medium which are opposite to each other so that a transmission of the optical signal in a first direction via the optical medium is carried out over a wavelength resource which is different from a wavelength resource used in a preceding transmission of the optical signal in a direction via the optical medium which is opposite to the first direction, and each of said optical retransmission units comprises at least one wavelength resource converter (WRC) operative to convert an input wavelength resource, over which an obtained replica of the optical signal is carried, into an output wavelength resource over which the obtained replica of the optical signal is transmitted; and an output unit operatively associated with at least one of said optical retransmission units and operative to output the optical signal from one of said ends of the optical medium after at least one back and forth transmission cycle of the optical signal via the optical medium.

13. The apparatus according to claim 12 and wherein said at least one WRC comprises a tunable wavelength resource converter (TWRC).

14. The apparatus according to claim 12 and wherein each of said optical retransmission units comprises at least one optical filter that is operative to obtain the replica of the optical signal.

15. The apparatus according to claim 14 and wherein said at least one optical filter comprises a tunable optical filter (TOF).

16. The apparatus according to claim 12 and wherein each of said optical retransmission units comprises a transmission multiplexer operative to provide the optical signal to the optical medium in a multiplexed form.

17. The apparatus according to claim 12 and also comprising a controller operative to control a switching element associated with one of said optical retransmission units for providing a delayed replica of the optical signal to the output unit.

18. The apparatus according to claim 12 and wherein said output unit comprises an output multiplexer operatively associated with a plurality of switching elements that are operatively associated with at least one of the optical retransmission units, the output multiplexer being operative to output the optical signal provided via one of the plurality of switching elements after at least one back and forth transmission cycle of the optical signal via the optical medium.

19. The apparatus according to claim 18 and wherein said output unit also comprises a tunable wavelength resource converter (TWRC) operatively associated with said output multiplexer and operative to convert a wavelength resource over which said optical signal is outputted from the output multiplexer into a selected wavelength resource.

20. The apparatus according to claim 12 and wherein said optical medium comprises at least one fiber optic cable.

21. The apparatus according to claim 20 and wherein said at least one fiber optic cable comprises a dispersion-shifted fiber optic cable.

22. The apparatus according to claim 12 and wherein said optical medium comprises at least one atmospheric path.

23. The apparatus according to claim 12 and wherein said optical medium comprises a medium capable of slowing light, and the apparatus also comprises means for applying conditions that enable said medium to slow light.

24. The apparatus according to claim 12 and wherein said optical medium comprises at least one optical waveguide.

25. The apparatus according to claim 12 and wherein said wavelength resource comprises at least one of the following: a wavelength; a lightpath; and a polarization direction over a wavelength.

26. The apparatus according to claim 12 and also comprising dispersion compensation means operative to compensate for dispersion of the optical signal while traversing the optical medium.

27. The apparatus according to claim 12 and also comprising an optical amplifier operative to amplify the optical signal while traversing the optical medium.

28. The apparatus according to claim 27 and wherein said optical amplifier comprises a Raman amplifier.

29. An optical communication network comprising the apparatus of claim 12, wherein each of said optical retransmission units is comprised in a network element (NE) in the optical communication network.

30. The network according to claim 29 and wherein said optical medium comprises at least one normally redundant fiber optic cable associating two of said optical retransmission units.

31. The network according to claim 29 and wherein said optical medium comprises at least one normally active fiber optic cable associating two NEs in the network, and each said wavelength resource comprises a wavelength resource that is not normally used in communication between said two NEs over said at least one normally active fiber optic cable.

32. An optical memory comprising:
at least one optical memory cell comprising the apparatus of claim 12; and
a memory controller operatively associated with said at least one memory cell and operative to control storage in and retrieval from said at least one memory cell.

33. A delayed optical signal generated from an inputted optical signal that is transmitted back and forth between at least two ends of an optical medium in directions in the optical medium which are opposite to each other and outputted from one of said ends of the optical medium after at least one back and forth transmission cycle via the optical medium, wherein a transmission of the inputted optical signal in a first direction via the optical medium is carried out over a wavelength resource which is different from a wavelength resource used in a preceding transmission of the inputted optical signal in a direction via the optical medium which is opposite to the first direction, and transmitting the inputted optical signal comprises:

obtaining a single replica of the inputted optical signal that is carried over an input wavelength resource;

converting said input wavelength resource into an output wavelength resource; and transmitting said single replica of the inputted optical signal over said output wavelength resource.

* * * * *